(12) United States Patent
Imaizumi et al.

(10) Patent No.: US 10,855,882 B2
(45) Date of Patent: Dec. 1, 2020

(54) IMAGE PROCESSING TO SET AN OUTPUT GRADATION NUMBER BASED ON AN INFORMATION-LOSS EVALUATION VALUE

(71) Applicant: SHARP KABUSHIKI KAISHA, Sakai (JP)

(72) Inventors: Daisaku Imaizumi, Sakai (JP); Teruhiko Matsuoka, Sakai (JP); Masahiko Takashima, Sakai (JP); Yasushi Adachi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/503,303

(22) Filed: Jul. 3, 2019

(65) Prior Publication Data

US 2020/0014820 A1 Jan. 9, 2020

(30) Foreign Application Priority Data

Jul. 6, 2018 (JP) ................................. 2018-129080

(51) Int. Cl.
  *H04N 1/407* (2006.01)
  *H04N 1/40* (2006.01)
  *H04N 1/00* (2006.01)
  *H04N 1/409* (2006.01)
  *H04N 1/60* (2006.01)

(52) U.S. Cl.
  CPC ....... *H04N 1/4072* (2013.01); *H04N 1/00005* (2013.01); *H04N 1/00039* (2013.01); *H04N 1/409* (2013.01); *H04N 1/40062* (2013.01); *H04N 1/40087* (2013.01);

(Continued)

(58) Field of Classification Search
  CPC .............. H04N 1/233; H04N 1/40062; H04N 1/40081; H04N 1/40087; H04N 1/403; H04N 1/407; H04N 1/4072; H04N 1/4074; H04N 1/52; H04N 1/6027; H04N 1/6072; G06K 15/1852; G06K 15/1872; G06K 15/1878; G06K 15/1881; G06F 3/1243
  See application file for complete search history.

(56) References Cited

U.S. PATENT DOCUMENTS

| 5,446,802 A * | 8/1995 | Tada ................. H04N 1/40062 382/170 |
| 6,731,400 B1 * | 5/2004 | Nakamura ............ G06K 15/00 358/1.9 |

(Continued)

FOREIGN PATENT DOCUMENTS

JP 2007-266921 A 10/2007

*Primary Examiner* — Scott A Rogers
(74) *Attorney, Agent, or Firm* — ScienBiziP, P.C.

(57) ABSTRACT

An image processing apparatus processes input image data and generates output image data. The image processing apparatus includes a feature-value calculating unit, an output-gradation-number setting unit, and an image processor. The feature-value calculating unit calculates a feature value from the input image data. The output-gradation-number setting unit sets, as the number of output gradations, any one gradation number of candidates for the number of output gradations based on the feature value calculated by the feature-value calculating unit. The image processor processes the input image data and generates the output image data having the number of output gradations which is set by the output-gradation-number setting unit.

14 Claims, 15 Drawing Sheets

(52) U.S. Cl.
CPC ......... *H04N 1/6027* (2013.01); *H04N 1/6072* (2013.01); *H04N 2201/0094* (2013.01)

(56) References Cited

U.S. PATENT DOCUMENTS

| | | | |
|---|---|---|---|
| 7,253,916 B2* | 8/2007 | Imaizumi | H04N 1/00954 358/1.15 |
| 7,417,755 B2* | 8/2008 | Imaizumi | H04N 1/00013 358/1.15 |
| 9,185,264 B2* | 11/2015 | Yoshida | H04N 1/4052 |
| 2005/0206912 A1* | 9/2005 | Megawa | H04N 1/6072 358/1.1 |

* cited by examiner

FIG. 3A

| 20 | 40 | 60 | 80 |
|---|---|---|---|
| 40 | 60 | 80 | 100 |
| 60 | 80 | 100 | 120 |
| 80 | 100 | 120 | 140 |
| 100 | 120 | 140 | 160 |
| 120 | 140 | 160 | 180 |
| 140 | 160 | 180 | 200 |
| 160 | 180 | 200 | 220 |

FIG. 3B

| 0 | 0 | 0 | 0 |
|---|---|---|---|
| 0 | 0 | 0 | 0 |
| 0 | 0 | 0 | 255 |
| 0 | 0 | 255 | 255 |
| 0 | 255 | 255 | 255 |
| 255 | 255 | 255 | 255 |
| 255 | 255 | 255 | 255 |
| 255 | 255 | 255 | 255 |

FIG. 3C

| 20 | 40 | 60 | 80 |
|---|---|---|---|
| 40 | 60 | 80 | 100 |
| 60 | 80 | 100 | 135 |
| 80 | 100 | 135 | 115 |
| 100 | 135 | 115 | 95 |
| 135 | 115 | 95 | 75 |
| 115 | 95 | 75 | 55 |
| 95 | 75 | 55 | 35 |

FIG. 4A

| 20 | 20 | 20 | 20 |
|---|---|---|---|
| 20 | 20 | 20 | 80 |
| 20 | 20 | 80 | 160 |
| 20 | 80 | 160 | 220 |
| 80 | 160 | 220 | 220 |
| 160 | 220 | 220 | 220 |
| 220 | 220 | 220 | 220 |
| 220 | 220 | 220 | 220 |

FIG. 4B

| 0 | 0 | 0 | 0 |
|---|---|---|---|
| 0 | 0 | 0 | 0 |
| 0 | 0 | 0 | 255 |
| 0 | 0 | 255 | 255 |
| 0 | 255 | 255 | 255 |
| 255 | 255 | 255 | 255 |
| 255 | 255 | 255 | 255 |
| 255 | 255 | 255 | 255 |

FIG. 4C

| 20 | 20 | 20 | 20 |
|---|---|---|---|
| 20 | 20 | 20 | 80 |
| 20 | 20 | 80 | 95 |
| 20 | 80 | 95 | 35 |
| 80 | 95 | 35 | 35 |
| 95 | 35 | 35 | 35 |
| 35 | 35 | 35 | 35 |
| 35 | 35 | 35 | 35 |

FIG. 9A
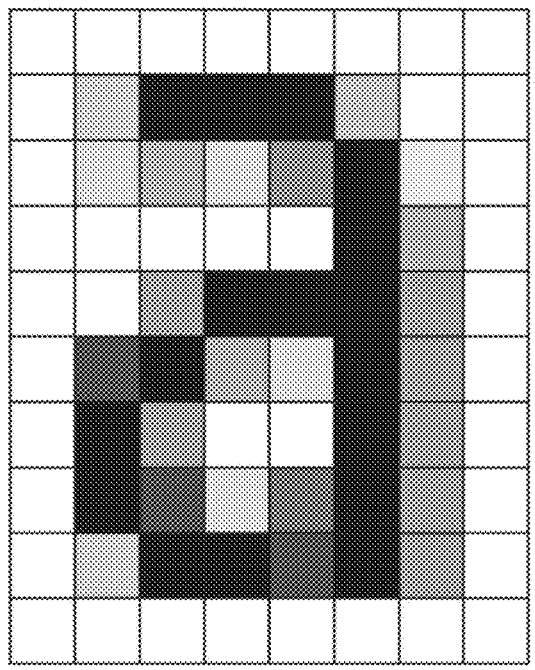
FIG. 9B
| 255 | 255 | 255 | 255 | 255 | 255 | 255 | 255 |
|---|---|---|---|---|---|---|---|
| 255 | 187 | 34 | 0 | 17 | 170 | 255 | 255 |
| 255 | 204 | 153 | 204 | 119 | 0 | 221 | 255 |
| 255 | 255 | 255 | 255 | 238 | 0 | 153 | 255 |
| 255 | 255 | 136 | 34 | 0 | 0 | 136 | 255 |
| 255 | 85 | 34 | 153 | 204 | 0 | 136 | 255 |
| 255 | 0 | 136 | 255 | 255 | 0 | 136 | 255 |
| 255 | 17 | 85 | 204 | 102 | 0 | 136 | 255 |
| 255 | 187 | 17 | 0 | 85 | 17 | 136 | 255 |
| 255 | 255 | 255 | 255 | 255 | 255 | 255 | 255 |
FIG. 9C
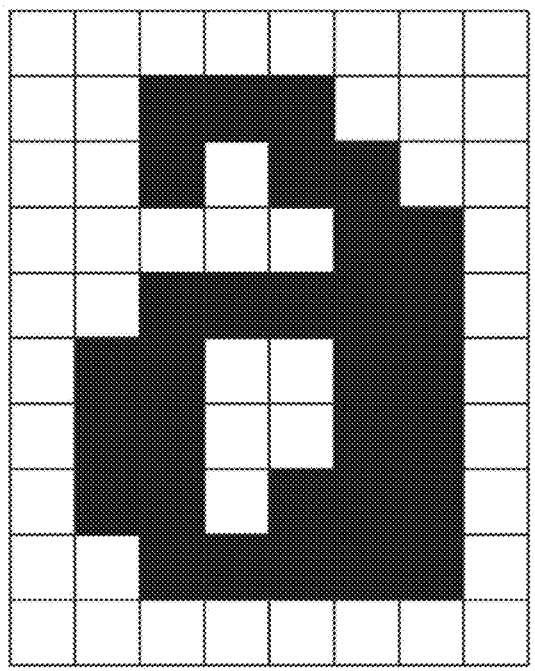
FIG. 9D
| 255 | 255 | 255 | 255 | 255 | 255 | 255 | 255 |
|---|---|---|---|---|---|---|---|
| 255 | 255 | 0 | 0 | 0 | 255 | 255 | 255 |
| 255 | 255 | 0 | 255 | 0 | 0 | 255 | 255 |
| 255 | 255 | 255 | 255 | 255 | 0 | 0 | 255 |
| 255 | 255 | 0 | 0 | 0 | 0 | 0 | 255 |
| 255 | 0 | 0 | 0 | 255 | 0 | 0 | 255 |
| 255 | 0 | 0 | 255 | 255 | 0 | 0 | 255 |
| 255 | 0 | 0 | 255 | 0 | 0 | 0 | 255 |
| 255 | 255 | 0 | 0 | 0 | 0 | 0 | 255 |
| 255 | 255 | 255 | 255 | 255 | 255 | 255 | 255 |

| CODE | NAME | SEX |
|---|---|---|
| 10001 | TARO KATO | MALE |
| 10002 | HANAKO SATO | FEMALE |
| 10003 | JIRO TAKAGI | MALE |

FIG. 17B
RELATED ART

| CODE | NAME | SEX |
|---|---|---|
|  |  |  |
| 10002 | HANAKO SATO | FEMALE |
|  |  |  |

IMAGE PROCESSING TO SET AN OUTPUT GRADATION NUMBER BASED ON AN INFORMATION-LOSS EVALUATION VALUE

BACKGROUND

1. Field

The present disclosure relates to an image processing apparatus and the like.

2. Description of the Related Art

Recently, digital multi-function devices (MFPs) and the Internet have become popular. Thus, not only transmission of printed images by fax or the like, but also transmission of attached image data, which is obtained in such a manner that a scanner reads an image on paper and the scanned data is converted into an electronic data format, through electronic mail is performed commonly.

These days, MFPs including auto document feeders (hereinafter abbreviated as "ADFs") for transporting paper to scanner portions for reading documents have become popular. Instead of an operation in which sheets of a document are set and scanned one by one, when sheets of a document, which are to be read, are set as a set to an ADF and scanning is started, the ADF may scan the sheets of a document one by one automatically and continuously. Thus, an environment, in which a burden of scan operations on users is reduced, has been created.

However, since time and labor for setting sheets of document one by one are saved due to use of the ADFs, users are not aware of the content of documents, and tend to set sheets at the ADFs in the state in which images having different attributes are mixed in the document sets. For example, color-image documents and monochrome-image documents may be mixed in a document set. In another example, text-data documents and photograph-data documents may be mixed in a document set.

As a scanning method, there is a known method in which read images are converted into various formats of image data, such as a color image, a gray-scale image, or a black-and-white binary image. For example, in the case where various documents are mixed in a document set as described above, if an appropriate scanning method is not selected in accordance with each document, an image is distorted so as to be made illegible. Thus, there arises a problem in that a large amount of information may be lost.

In view of the state described above, for example, the following technique is known: the attribute of an image, such as whether the image is a color image or a monochrome image, or whether the image is text data or photograph data, is detected as classification of the type of document; the scanning method is switched in accordance with the detected attribute.

For example, according to Japanese Unexamined Patent Application Publication No. 2007-266921, it is determined whether a read image is color or monochrome. Then, if the read image is monochrome, it is determined whether image data is to be multivalued gray-scaling data or binary data, on the basis of the purpose of use or the layout of the image, and the image is processed.

When the determination is made on the basis of the layout, a read document image, which is achromatic-color (monochrome) data, is analyzed in terms of the document layout. The ratio of text data to the document and the ratio of photograph data to the document are checked. It is determined whether the document is to be handled as a text document or a photograph document in accordance with the ratios. For example, if photograph data having an amount equal to or larger than a given ratio is present, the document is determined as a photograph document. In contrast, if photograph data having an amount smaller than the given ratio is present, the image is determined to be a text document. Referring to the determination, if the document is text data, achromatic data is converted from a gray scale to black and white. Thus, the technique is disclosed in which, in accordance with the type of document, switching is performed between gray-scale data and black-and-white binary data.

However, in the method according to Japanese Unexamined Patent Application Publication No. 2007-266921, the determination as to whether a read image is used as gray-scale data or black-and-white binary data may be inappropriate. In particular, when a read image is to be processed as binary data, a large amount of information may be lost.

For example, the system according to Japanese Unexamined Patent Application Publication No. 2007-266921 is suitable for the case in which a read image is text data in which black characters are written on a white background. However, in fact, other than such a case, the case in which, as illustrated in FIG. 17A, a read image is text data in which black characters are written on a halftone-color background may be present. If such a text data document is processed by using the system according to Japanese Unexamined Patent Application Publication No. 2007-266921, the document may be processed as a black-and-white binary image in which both of backgrounds and characters are illustrated in black, and the characters may be illegible as illustrated in FIG. 17B.

The reason of this is that the method according to Japanese Unexamined Patent Application Publication No. 2007-266921 determines whether a read image is to be processed as binary data or gray-scale data only on the basis of qualitative grounds that a text document is suitable for binary data and that photograph data is suitable for gray-scale data. In the method according to Japanese Unexamined Patent Application Publication No. 2007-266921, the validity for whether a read image is to be output as binary data or gray-scale data is not evaluated quantitatively. That is, the method according to Japanese Unexamined Patent Application Publication No. 2007-266921 may be a method with which the read image illustrated in FIG. 17A is processed with low determination accuracy.

It is desirable to provide an image processing apparatus, an image processing method, and a recording medium which set the number, which is appropriate, of output gradations with high accuracy and which generate an output image.

SUMMARY

An image processing apparatus provided by the present disclosure processes input image data and generates output image data. The image processing apparatus includes a feature-value calculating unit, an output-gradation-number setting unit, and an image processor. The feature-value calculating unit calculates a feature value from the input image data. The output-gradation-number setting unit sets, as the number of output gradations, any one gradation number of candidates for the number of output gradations based on the feature value calculated by the feature-value calculating unit. The image processor processes the input image data and generates the output image data having the number of output gradations which is set by the output-gradation-number setting unit.

An image processing method provided by the present disclosure includes calculating a feature value from input image data; setting, as the number of output gradations, any one gradation number of candidates for the number of output gradations based on the calculated feature value; and processing the input image data and generating output image data having the number of output gradations which is set.

A computer-readable recording medium provided by the present disclosure stores a computer program for causing a computer to operate the image processing apparatus.

BRIEF DESCRIPTION OF THE DRAWINGS

FIGS. 3A to 3C are diagrams illustrating a feature-value example of an image which is gradational, according to the first embodiment;

FIGS. 4A to 4C are diagrams illustrating a feature-value example of an image which is not gradational, according to the first embodiment;

FIGS. 9A to 9D are diagrams for describing a first evaluation image and a second evaluation image according to the first embodiment;

FIG. 10 is a diagram for describing difference image data according to the first embodiment;

FIGS. 17A and 17B are diagrams illustrating a result example of a binarization process of the related art.

DESCRIPTION OF THE EMBODIMENTS

Figure 1:
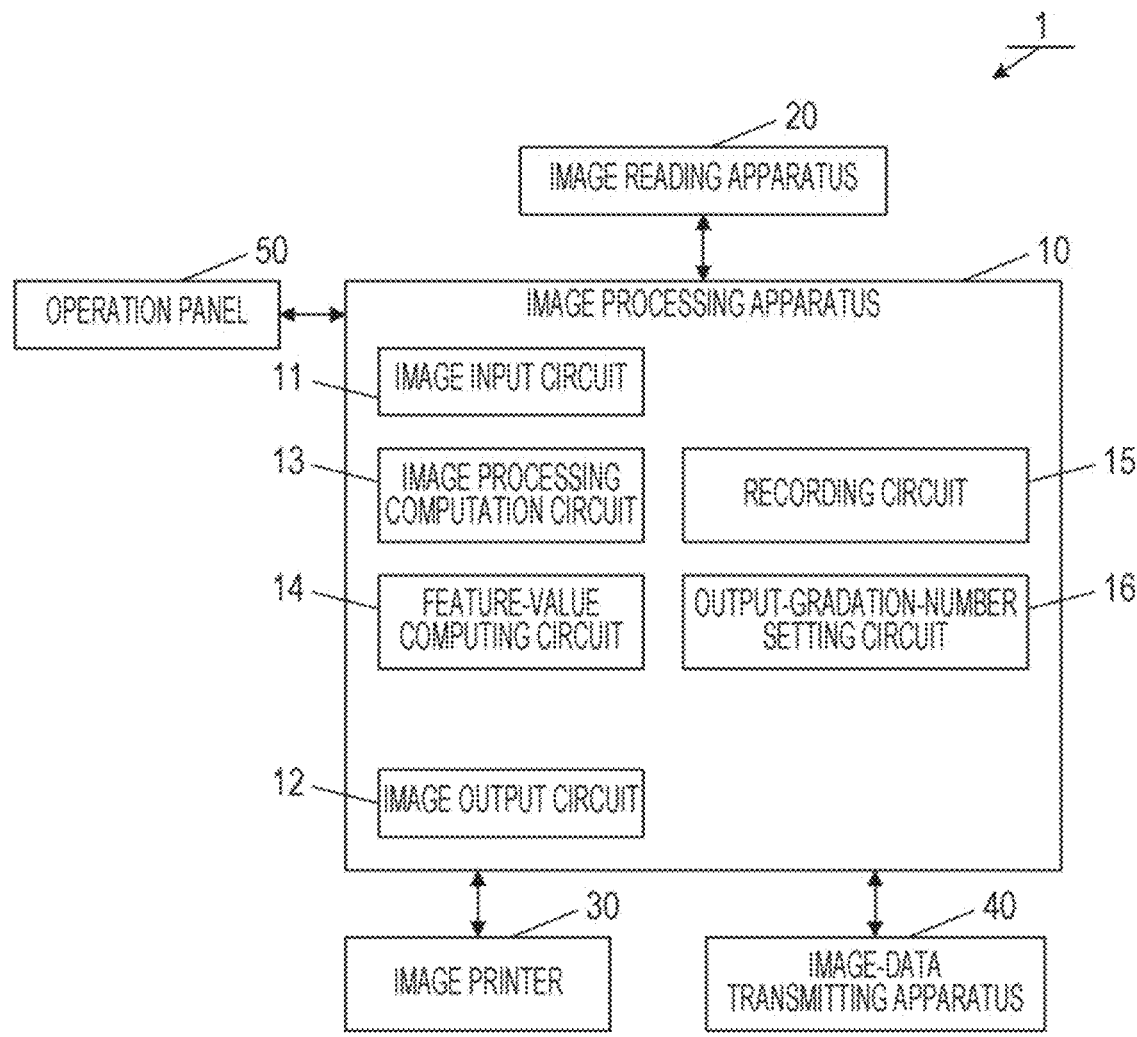
FIG. 1 is a diagram for describing the functional configuration of an image processing apparatus according to a first embodiment.

Embodiments of the present disclosure will be described below in detail by referring to the drawings. In the description below, embodiments, in which an image processing apparatus provided by the present disclosure is included in an image forming apparatus, will be described.

1. First Embodiment 1.1 Functional Configuration

FIG. 1 is a block diagram illustrating the functional configuration of an image forming apparatus 1 according to a first embodiment. The image forming apparatus 1 is a digital multi-function device having a copy function, a print function, a scanner function, and the like. The image forming apparatus 1 includes an image processing apparatus 10, an image reading apparatus 20, an image printer 30, and an image-data transmitting apparatus 40.

An operation panel 50 is connected to the image reading apparatus 20, the image processing apparatus 10, the image printer 30, and the image-data transmitting apparatus 40. The operation panel 50 includes an operation unit (not illustrated) including a numeric keypad and setting buttons for a user who sets operational modes of the image forming apparatus 1, and also includes a display unit (not illustrated) formed, for example, of a liquid crystal display.

Various types of processing performed by the image forming apparatus 1 are controlled by a controller (a computer including a processor, such as a central processing unit (CPU) or a digital signal processor (DSP)) which is not illustrated. The controller of the image forming apparatus 1 performs data communication, for example, with computers and other digital multi-function devices, which are connected over a network, through a network card and LAN cables (not illustrated). The units of the image forming apparatus 1 will be described in detail below.

The image reading apparatus 20 reads an image from a document optically. The image reading apparatus 20, which is formed of a color scanner, for example, having a charge coupled device (CCD), reads a reflected light image from a document by using the CCD as an RGB (R: red, G: green, B: blue) or monochrome analog signal, and outputs the read signal to the image processing apparatus 10. The image reading apparatus 20 is not necessarily a scanner, and may be, for example, a digital camera.

The image processing apparatus 10 includes an image input circuit 11, an image output circuit 12, an image processing computation circuit 13, a feature-value computing circuit 14, a recording circuit 15, and an output-gradation-number setting circuit 16.

The image input circuit 11 generates input image data on the basis of an analog signal which is output by the image reading apparatus 20 to the image processing apparatus 10. The image input circuit 11 is not limited to the example described above, and may receive image data from the outside and may use the received image data as input image data.

The image processing computation circuit 13 performs image processing on the input image data, and generates new image data. Examples of the image processing include resolution change processing, smoothing processing, sharpening processing, gradation converting processing such as gamma correction, monochrome-color converting processing, and processing for changing image data to data having a different number of gradations, such as a black-and-white binary image or a multi-gradation image (for example, a gray-scale image).

The feature-value computing circuit 14 performs a computation for calculating a feature value used to determine the number, which is appropriate, of output gradations on the basis of image data. A feature value may be simple numeric data or feature-value image data that handles, as image data, pieces of numeric data, which indicate feature values for the pixels in image data. In addition, a feature value is not necessarily a single component, and may be a vector having multiple components. That is, a feature value may be feature-value image data. The feature-value image data is formed of pixels whose number is the same as those of a first evaluation image and a second evaluation image which are described below. In addition, the feature-value image data has multiple components for each pixel.

The recording circuit 15 is a recording device which records information about candidates for the number of output gradations and other various types of setting information in advance, and which temporarily stores image data generated in an image processing computation during image processing. As the recording circuit 15, a volatile memory, a nonvolatile memory, or a combination of these may be used.

The output-gradation-number setting circuit 16 determines the number, which is the most appropriate for representation of input image data, of gradations among the candidates for the number of output gradations, which are recorded in the recording circuit 15, on the basis of a feature value calculated by the feature-value computing circuit 14, and sets the determined number as the number of output gradations. According to the number of output gradations which is set by the output-gradation-number setting circuit 16, the image processing computation circuit 13 converts the number of gradations of the input image data, and generates output image data.

The image output circuit 12 outputs the output image data generated by the image processing apparatus 10, in an electronic data format to the outside of the image processing apparatus 10.

The image printer 30 prints an image on a sheet on the basis of the output image data. As the image printer 30, typical electrophotography or a typical printer may be used.

The image-data transmitting apparatus 40 transmits the output image data to the outside over a network. As the image-data transmitting apparatus 40, typical electronic mail may be used.

1.2 Process Flow

Figure 2:
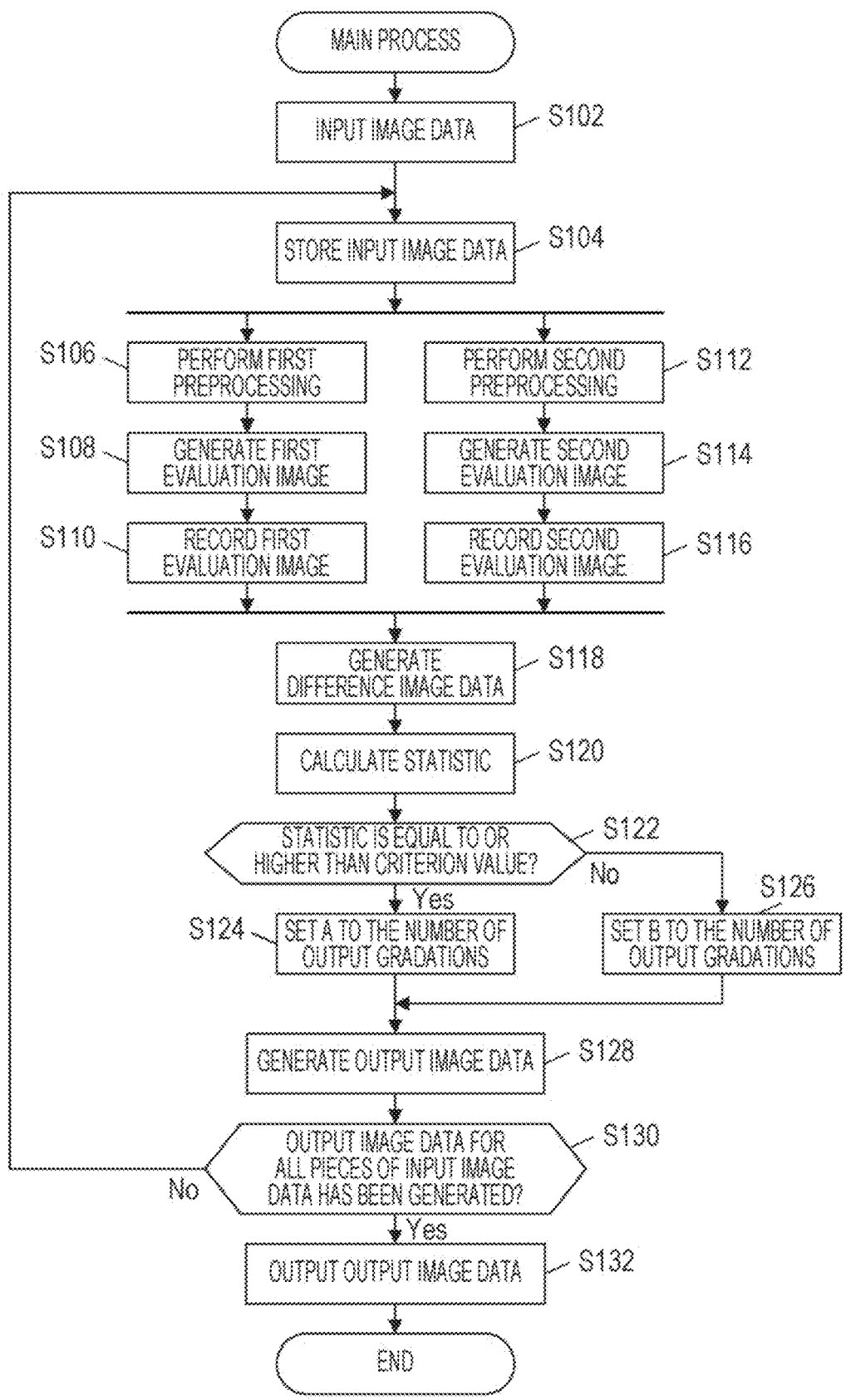
FIG. 2 is a flowchart for describing a process according to the first embodiment.

Referring to FIG. 2, a method of generating output image data in the image forming apparatus 1 having the configuration described above will be described in detail.

1.2.1 Input of Image Data

First, the image reading apparatus 20 reads an original image on writing paper optically, and outputs the image as an analog signal to the image processing apparatus 10. Then, the image input circuit 11 included in the image processing apparatus 10 converts the signal into image data which is electronic data. Thus, image data based on the writing paper is input (step S102). This method is equivalent to that of a typical scanner. The reading method may be a method in which documents are set one by one to the image reading apparatus 20 manually, or may be a method in which multiple sheets of document are read continuously by using an automatic document feeding function (ADF). The first embodiment assumes the following case: the method in which multiple sheets of document which have been set are read continuously by using an automatic document feeding function is employed; and images having different attributes, such as a text data image and a photograph data image, are mixed in the multiple sheets of document.

The image reading apparatus 20 is provided with a document feeding mechanism (ADF). Multiple sheets of document, which are set, are transferred one by one continuously to the image reading apparatus 20 by using the document feeding mechanism. The image reading apparatus 20 reads each sheet of the transferred document, generates image data for each sheet of document, and transmits the image data to the image processing apparatus 10.

The image processing apparatus 10 performs the following processes on each sheet of document. The image processing apparatus 10 first stores image data, which is received though the image input circuit 11, as input image data temporarily in the recording circuit 15 (step S104).

1.2.2 Generating a First Evaluation Image

The input image data may be unsuitable for setting the number, which is appropriate, of gradations, such as the case in which the original resolution of the input image data is too large or in which the contrast is not appropriate. Therefore, the image processing computation circuit 13 first performs image correction on the input image data in the following image processing (preprocessing) so that the input image data is converted into image data suitable for setting the number, which is appropriate, of gradations (first preprocessing) (step S106).

Examples of the image processing performed as the preprocessing are as follows.

(1) Resolution Conversion Processing

The resolution of the input image data as it is may be too large to determine the number of gradations. Therefore, the resolution, that is, the size, of the image is converted. As an exemplary technique for resolution conversion, for example, the nearest neighbor method or the bilinear interpolation method, which are known as image interpolation methods, may be used. In the nearest neighbor method, the value of the closest pixel is used as it is. In the bilinear interpolation method, calculation is performed on the basis of the values of the surrounding four pixels by using weights in accordance with the distances from the surrounding four pixels. A change of the resolution makes the pixel count of the first evaluation image smaller than the pixel count of the original input image data, achieving a reduction in the processing load in the subsequent computing processing. For example, when the resolution of an image obtained after scanning is 300 dpi, the resolution is converted so that image data of 150 dpi is obtained. Thus, the pixel count of the image data may be reduced to a quarter of the pixel count of the original input image. A feature value used to set the number, which is appropriate, of gradations is computed for each pixel of the first evaluation image. That is, the pixels of the first evaluation image serve as evaluation pixels for computation of feature values. Unless otherwise specified, evaluation pixels are not discriminated from normal pixels, and the evaluation pixels are simply referred to as pixels.

(2) Contrast Adjustment Processing

For the image which is obtained after the resolution conversion processing, its brightness and contrast on the input side of the output image are adjusted. To do this, a lookup table and the like are used to adjust the image data so that the image data has output values indicating desired characteristics. The lookup table and the like store output values corresponding to input values in the one-to-one relationship. As such image processing, a technique generally called γ correction may be used.

(3) Smoothing/Sharpening Processing

Sharpening filtering is performed on the image, which is obtained after the contrast adjustment processing, to convert a blurry image into a sharp image. On the contrary, filtering, which is called smoothing filtering, is performed to convert an image, in which edge portions are too conspicuous and which gives a stiff impression, into a smooth image. Thus, appropriate filtering for an output image is performed. This image processing is implemented by a spatial filtering unit performing a convolution operation on a target pixel and its surrounding pixels in an image with a coefficient called a filter kernel.

For example, as spatial filtering involving execution of a convolution operation, a moving average filter, a weighted average filter, and the like are typically known. A target pixel in an image which is input by applying such a filter has a pixel value obtained by averaging the target pixel and its surrounding pixels. Thus, a change in pixel values is made gentle, which indicates that smoothing processing has been performed.

A designer is to select appropriately from the following options: which is to be performed, smoothing processing or sharpening processing; whether none of smoothing processing and sharpening processing is to be performed; and whether both are to be combined.

Image data newly generated by performing image processing (preprocessing), such as processing (1) to (3), as the first preprocessing on the input image data is used as the first evaluation image data (step S108), and is recorded in the recording circuit 15 (step S110). Part of the image processing (1) to (3) may be skipped. In addition to this image processing, other known image processing may be added. Alternatively, all of the image processing (1) to (3) may be skipped, and the input image data itself may be used as the first evaluation image data. A combination or the order of the various types of image processing may be set appropriately in the range aimed at "correction for obtaining image data suitable for setting the number, which is appropriate, of gradations".

When the input image data itself may be used to determine the number, which is appropriate, of gradations, all of the preprocessing may be skipped. In this case, the input image data itself may be used as the first evaluation image data.

1.2.3 Generating a Second Evaluation Image

The image processing computation circuit 13 performs image processing (second preprocessing) on the input image data (step S112), generates an image (for example, a black-and-white binary image) having the number, which is given, of gradations less than the number of gradations of the first evaluation image data, and uses the generated image as the second evaluation image (step S114). The second preprocessing may be the same as or different from the first preprocessing. Alternatively, the image processing may be skipped, and the input image data itself may be used as the second evaluation image data.

For example, processing using a threshold, such as simple threshold processing, and the error diffusion method are well-known techniques as a method of reducing the number of gradations, that is, a technique of binarizing the number of gradations or making the number of gradations multivalued.

In the first embodiment, the case in which the candidates for the number of output gradations are the following two images will be described: a gray-scale image of 8 bits (the number of gradations is 256); and a black-and-white binary image of one bit (the number of gradations is two). In the description below, among the candidates for the number of output gradations, the number, which is larger, of gradations is referred to as A (in the first embodiment, 256), and the number, which is smaller, of gradations is referred to as B (in the first embodiment, two).

In the first embodiment, among the candidates for the number of output gradations, the second evaluation image is generated on the basis of the value of B, as a black-and-white binary image whose number of gradations is two. The value of B is the number, which is smaller, of gradations, that is, two. Specifically, it is determined whether or not, for each pixel of the first evaluation image data, the gradation value in the first evaluation image data is equal to or higher than a threshold, which has been set. When the gradation value in the first evaluation image data is equal to or higher than the set threshold, the gradation value of the pixel is set to "1" which is a gradation value indicating white. When the gradation value is lower than the set threshold, the gradation value of the pixel is set to "0" which is the gradation value indicating black. Thus, image data, for which the pixel count is the same as that of the first evaluation image and in which the gradation value of each pixel is "0" or "1", that is, image data, whose number of gradations is two, is generated. The newly generated black-and-white binary image data is recorded as the second evaluation image in the recording circuit 15 (step S116).

As described above, the pixel count of the second evaluation image is the same as that of the first evaluation image. Similarly to the pixels of the first evaluation image, the pixels of the second evaluation image are pixels to be evaluated.

A combination of candidates for the number of output gradations is not necessarily limited to two types, eight bits and one bit. For example, three or more candidates for the number of output gradations may be used, or other candidates for the number of gradations, such as four bits and 16 bits, may be included. The first evaluation image and the second evaluation image are not necessarily black-and-white (achromatic color) images, and may be color (chromatic color) images.

1.2.4 Generating Difference Image Data

The feature-value computing circuit 14 generates difference image data on the basis of the first evaluation image and the second evaluation image (step S118). The difference image data may be feature-value image data obtained by converting, for each pixel, the degree of information loss, which occurs between the first evaluation image and the second evaluation image, into a number.

As described above, the second evaluation image is image data generated on the basis of the first evaluation image. The second evaluation image and the first evaluation image are image data having the same pixel count.

As preparation for generating the difference image data, normalization process (preparation process) for making the range of the gradation values in the first evaluation image match that in the second evaluation image is performed. For example, assume that the first evaluation image is an 8-bit gray-scale image, for which the minimum gradation value is 0 and for which the maximum gradation value is 255, and that the second evaluation image is a black-and-white binary image, for which the minimum gradation value is 0 and for which the maximum gradation value is 1. In this state, the range of gradation values in the first evaluation image does not match that in the second evaluation image. Therefore, the second evaluation image is multiplied by a given scaling factor (255) so that the maximum value of the second evaluation image is the same as that of the first evaluation image, 255. Thus, the gradation value of each pixel of the first evaluation image and that of the second evaluation image may be subjected to calculation in the same range of gradation values.

After the preparation process, the image processing computation circuit 13 calculates the difference value between the gradation value of each pixel of the first evaluation image and that of the corresponding pixel of the second evaluation image. New image data in which the calculated difference values are set to the gradation values of the respective pixels is generated. The newly generated image data is recorded as the difference image data in the recording circuit 15. The pixel count of the difference image data is the same as those of the first evaluation image and the second evaluation image. Similarly to the pixels of the first evaluation image and the second evaluation image, the pixels of the difference image data are evaluation pixels.

The difference values may be used as feature values indicating the degrees of change in the gradation values obtained, for example, when a binary image is generated from an image having multiple pixel values, that is, the magnitude of information loss produced when a black-and-white binary image is generated. For example, the absolute values of the differences between the pixel values at the same pixel positions in the original image and the binarized image are calculated in the entire image. That is, the absolute value of the difference at each pixel position is calculated.

An example will be described by referring to figures. FIG. 3A is a partial enlarged view of an image, such as a photograph, which is gradational and which has four pixels horizontally and eight pixels vertically (the number of gradations is 256). FIG. 3B is a partial enlarged view of the case in which a black-and-white binary image is generated by using a threshold of "110" in such a manner that, for the gradation value which is the pixel value of each pixel in FIG. 3A, if the gradation value is less than "110", the gradation value is converted into "0", and if the gradation value is equal to or more than "110", the gradation value is converted into "255". In FIGS. 3A and 3B, the value illustrated in a rectangle indicates the gradation value of the pixel at the corresponding position. FIG. 3C indicates the difference between the gradation value of each pixel in FIG. 3A and that of the corresponding pixel in FIG. 3B. The positions of the corresponding pixels in FIGS. 3A, 3B, and 3C correspond to one another. The gradation value of the top-left pixel is "20" in FIG. 3A; "0" in FIG. 3B. The difference value (the absolute value of the difference between the gradation values) of the top-left pixel in this example is "20". Similarly, the gradation value of the bottom-right pixel is "220" in FIG. 3A; "255" in FIG. 3B. The difference value of the bottom-right pixel in this example is "35". FIG. 4A is a partial enlarged view of an image, such as a character image, which is not gradational and which has four pixels horizontally and eight pixels vertically (the number of gradations is 256). FIG. 4B is a partial enlarged view of the case in which a black-and-white binary image (the threshold is 110) is generated from FIG. 4A. In FIGS. 4A and 4B, the value illustrated in a rectangle indicates the gradation value of the pixel at the corresponding position. FIG. 4C illustrates the difference value between the gradation values of each pixel set. Thus, the differences at the corresponding pixel positions are calculated on the basis of the original image and its binarized image. The difference at each corresponding pixel position may be used as a feature value indicating the magnitude of information loss.

Hereinafter, a value representing, as a number, the amount of information loss is called an information-loss evaluation value. As an exemplary information-loss evaluation value based on pixel values, the absolute value of the difference between corresponding pixels of images at the same position is used. The images are compared with each other in terms of the degree of change in gradation value as described herein.

Since a difference value itself may be positive or negative, an information loss produced in the case of conversion into a white pixel through binarization and an information loss produced in the case of conversion into a black pixel through binarization are considered as information losses having different characteristics. If, without discrimination between an information loss for a white pixel and an information loss for a black pixel, only the magnitude of the degree of information loss may be considered, a value obtained through conversion into a value equal to or more than zero, for example, by using an absolute value operation or a square operation may be used as an information-loss evaluation value.

In addition, in comparison between the first evaluation image and the second evaluation image, for example, when a change in the image edge (outline) in an image is to be focused on, an edge detection operator for extracting an edge is applied to each image. Thus, an edge image is generated.

As an edge detection operator, for example, operators in the horizontal direction (x) and the vertical direction (y), which are called Prewitt described in Expression (1) below or Sobel, are well known.

$$\text{Prewitt\_x} = \begin{bmatrix} -1 & 0 & 1 \\ -1 & 0 & 1 \\ -1 & 0 & 1 \end{bmatrix}, \quad (1)$$

$$\text{Prewitt\_y} = \begin{bmatrix} -1 & -1 & -1 \\ 0 & 0 & 0 \\ 1 & 1 & 1 \end{bmatrix}$$

A merit of execution of outline extraction processing is to detect a change in an edge portion of an image sensitively in determination of the amount of the change described below. For example, assume the case where image data to be processed is data of an image including a high-density character image. Even when the ratio of the change to the entire image is minute, if the outline shape of a character image is changed due to binarization, the character may be illegible due to occurrence of distortion of the character. The outline extraction processing is particularly effective to detect such a phenomenon sensitively. Therefore, a first' evaluation image and a second' evaluation image are generated by performing the preprocessing and the outline extraction processing on each of the first evaluation image described above and the second evaluation image after normalization. A difference image is generated from the first' evaluation image and the second' evaluation image. Thus, difference image data sensitive particularly to a change in an edge portion, for example, in a character may be generated.

Figure 5:
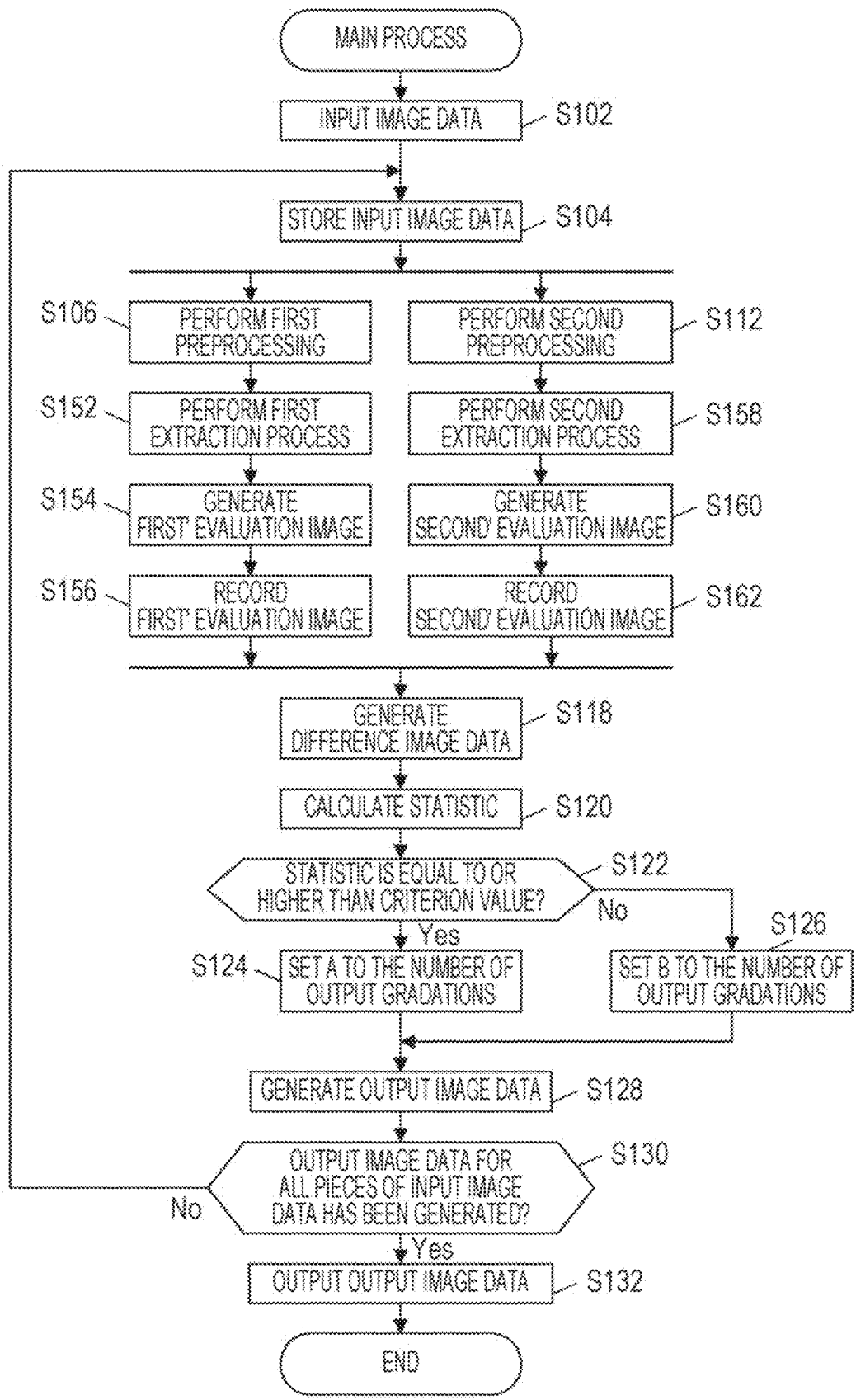
FIG. 5 is a flowchart for describing another exemplary process according to the first embodiment.

For example, after the first preprocessing and the second preprocessing, such outline extraction processing is performed as image processing on images obtained after the preprocessing. Specifically, as illustrated in FIG. 5, after the first preprocessing on the input image data, the outline extraction processing described above is performed as a first extraction process (step S152), and the first' evaluation image is generated and recorded (from step S154 to step S156). Similarly, after the second preprocessing on the input image data, the outline extraction processing described above is performed as a second extraction process (step S158), and the second' evaluation image is generated and recorded (from step S160 to step S162). In step S118, the feature-value computing circuit 14 generates difference image data on the basis of the first' evaluation image and the second' evaluation image. In step S112, when a black-and-white binary image has been generated on the basis of the input image data, the black-and-white binary image is normalized in advance, and the outline extraction processing is performed on the normalized image.

When there are three or more types of candidates for the number of output gradations, the processes from step S112 to step S118 are performed for each candidate for the number of output gradations. Thus, difference image data may be generated for each candidate for the number of output gradations.

1.2.5 Calculating a Statistic

Back to FIG. 2, the output-gradation-number setting circuit 16 calculates a statistic of the gradation values of the pixels of the entire difference image data, determines the number, which is appropriate, of output gradations on the basis of the statistic, and sets the determined number. As described above, the difference image data is image data generated on the basis of the difference values between the pixels of the first evaluation image and the respective pixels of the second evaluation image. Therefore, in a specific portion of an image, the magnitude of difference values (information-loss evaluation values) may be large (that is, the information loss is large); in another portion, the magnitude of difference values (information-loss evaluation values) may be small (that is, the information loss is small). Even in this case, the magnitude of the information loss of the entire image is evaluated overall on the basis of both of the information-loss evaluation values and the statistic. Thus, the number, which is appropriate, of output gradations may be set.

The output-gradation-number setting circuit 16 calculates the statistic (step S120). Typically, when the information loss is large, the difference values which are the gradation values of the difference image data, or the information-loss evaluation values expressed as the absolute values of the difference values tend to be large as a whole. Therefore, a statistical value reflecting the overall magnitude of the gradation values may be used as the statistic. Specifically, a total count (total value), an average, a median, or the like of the gradation values of the pixels of the entire difference image data may be used.

In addition, when the information loss is large, the difference values which are the gradation values, or the information-loss evaluation values expressed as variations in the difference values tend to be large as a whole. The reason of this is that, when the information loss is small, for almost all the pixels, the difference values which are the gradation values of the pixels, or the absolute values of the difference values are close to zero, and the variation is made small, while, when the information loss is large, there are many pixels having values other than 0, and the variation is therefore made large. Accordingly, as a statistic, a statistical value reflecting the magnitude of the variation in the gradation values may be used. Specifically, the variance, the standard deviation, the entropy, or the like of the gradation values of the pixels of the entire difference image data may be used.

Thus, the output-gradation-number setting circuit 16 calculates a statistic of the gradation values of the pixels of the entire difference image data, for example, on the basis of the integrated value (total value), the average, or the median of the gradation values of the pixels of the entire difference image data, or the variance, the standard deviation, or the entropy of the gradation values of the pixels. How the statistic is to be calculated may be selected by a designer appropriately or by a user.

1.2.6 Setting the Number of Output Gradations

The output-gradation-number setting circuit 16 sets the number of output gradations on the basis of the statistic calculated in step S120. For example, a criterion value for the statistic is set in advance. The output gradation value to be set is changed depending on whether or not the statistic is equal to or higher than the criterion value.

Thus, it may be determined whether or not use of the number of gradations of the second evaluation image as the number of output gradations is appropriate, on the basis of the statistic, enabling the number, which is proper, of gradations to be set.

For example, in the first embodiment, the output-gradation-number setting circuit 16 determines whether or not the statistic calculated in step S120 is equal to or higher than the given criterion value (step S122). If the statistic calculated in step S120 is equal to or higher than the given criterion value, it is determined that it is not suitable to set the number of gradations of the second evaluation image as the number of output gradations (in the first embodiment, the number of gradations, two, which is the value of B). The number of gradations (in the first embodiment, the number of gradations, 256, which is the value of A) which is the other candidate for the number of output gradations is set as the number of output gradations (from Yes in step S122 to step S124). If the statistic is lower than the given criterion value, it is determined that it is suitable to set the number of gradations of the second evaluation image as the number of output gradations (in the first embodiment, the number of gradations, two, which is the value of B). The number of gradations, two, is set as the number of output gradations (from No in step S122 to step S126).

The first embodiment, in which it is determined whether or not the statistic is equal to or higher than the preset criterion value, and in which the output gradation value is thus changed, is described. Instead of the criterion value, a criterion range may be set. That is, the output gradation value may be changed depending on whether or not the statistic falls in the criterion range.

The method described above is exemplary. A method of setting the number, which is appropriate, of output gradations is not limited to this. The point of the present disclosure is that the magnitude of information loss produced when an output image for the specific number of output gradations is generated by using feature values is determined by using the information-loss evaluation values so that the degree of appropriateness for generation of an output image for the number of output gradations may be determined quantitatively and the determination may be used to set the number, which is appropriate, of output gradations. As long as the point is not lost, other methods may be used.

1.2.7 Generating Output Image Data

The image processing computation circuit 13 performs image processing on the input image data recorded in the recording circuit 15, and generates image data, which is expressed by using the number of output gradations which has been set, as output image data (step S128). Similarly to generation of the second evaluation image, known typical techniques may be used to generate output image data expressed by using the number of output gradations different from the number of gradations of the input image. If the image processing apparatus 10 determines that the image processing computation circuit 13 has not generated output image data for all pieces of the input image data (No in step S130), the image processing apparatus 10 performs processes from step S104 on the unprocessed input image data.

If output image data has been generated for all pieces of the input image data, the image output circuit 12 outputs the generated output image data to the outside of the image processing apparatus 10 (from Yes in step S130 to step S132). In accordance with the settings or an operation on the operation panel 50, the image printer 30 prints the output image data on sheets or the image-data transmitting apparatus 40 transmits the output image data to the outside over a network.

1.3 Exemplary Operations

Figure 6:
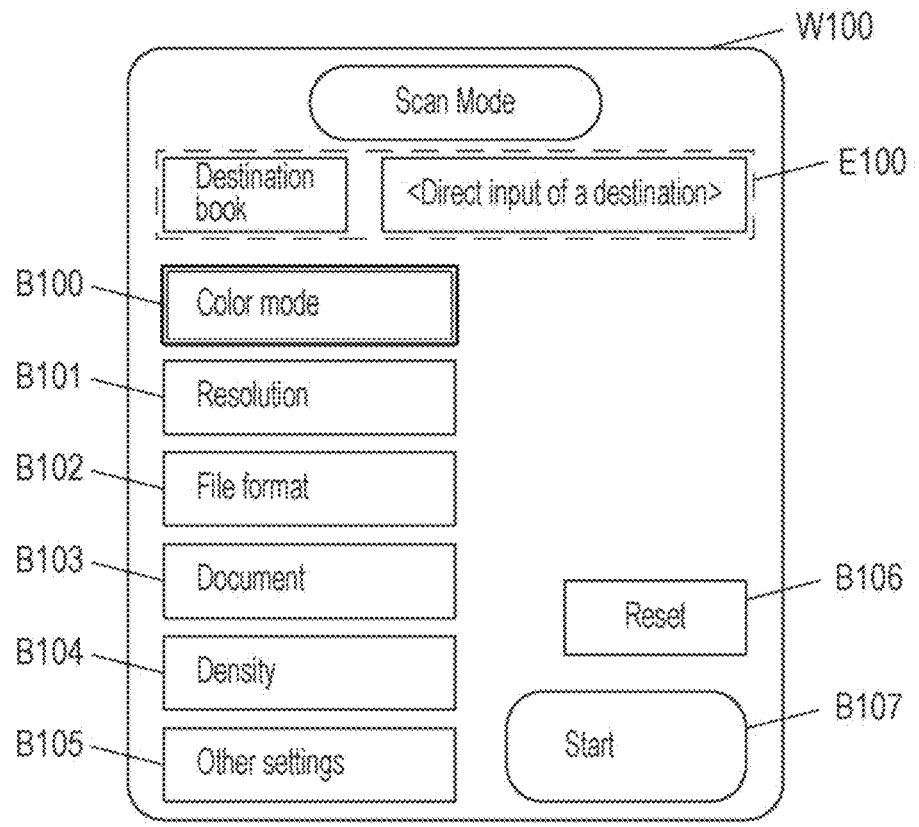
FIG. 6 is a diagram illustrating an exemplary scan-mode setting screen according to the first embodiment.

Referring to figures, exemplary operations according to the first embodiment will be described. First, switching among operations for an information loss determination function using the operation unit will be described. FIG. 6 illustrates an exemplary setting screen W100 displayed on the display unit of the image forming apparatus 1 when an operation in the scan mode, in which a scanned image is transmitted through mail or the like, is performed. The screen is provided with a display area E100, a color mode button B100, a button B101, a button B102, a button B103, a button B104, an other-settings button B105, a reset button B106, and a start button B107. In the display area E100, a button, for entering an operation screen for selecting from a registered destination list from which a transmission destination is specified, and for making a transition to an input screen in which a destination is input directly, and a text box for inputting a destination directly are included. The color mode button B100 is used to specify the color of a scan image to be transmitted. The button B101 is used to specify the resolution of a scan image. The button B102 is used to specify the file format of image data of a scan image that is to be transmitted to a destination. The button B103 is used to specify the type of a document, such as whether the scan image is a document including only characters or a document including photographs and figures having gradations. The button B104 is used to set the density of output image data. The other-settings button B105 is used to make a transition for selection of other functions, such as display of a menu for instructing that the front and back sides of a document are to be read. The reset button B106 is used to redo various settings. The start button B107 is used to start scanning.

As exemplary information loss, a method of enabling/disabling a function of avoiding distortion of characters due to binarization will be described.

Figure 7:
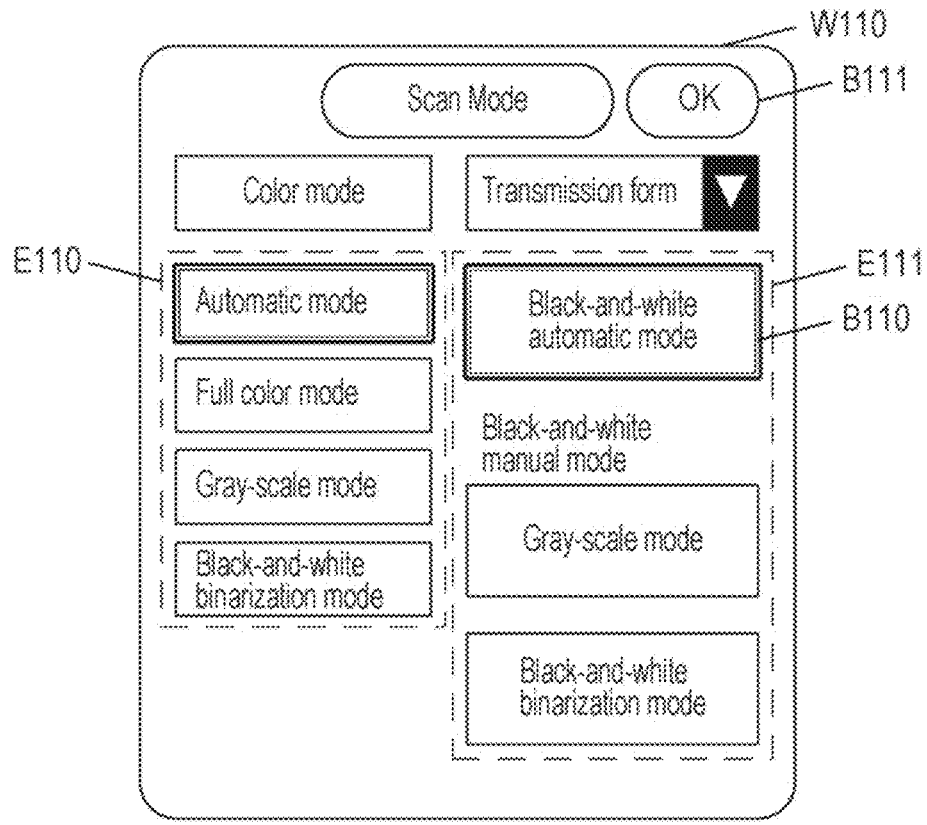
FIG. 7 is a diagram illustrating an exemplary color-mode setting screen according to the first embodiment.

Distortion of characters due to binarization may be avoided by handling a scan image as a gray-scale document. Therefore, when an auto color selection (ACS) function determines that a document is a black-and-white (achromatic color) document, a setting for selecting from two options may be set. The first option is that the system is further to determine whether the document is a gray-scale document or a black-and-white binary document. The second option is that a user is to select a gray-scale document or a black-and-white binary document by specifying the corresponding mode for scanning. FIG. 7 illustrates an exemplary color-mode setting screen W110 displayed on the display unit when the color mode button B100 in FIG. 6 is selected.

As illustrated in FIG. 7, the color-mode setting screen W110 includes an area E110, an area E111, and an OK button B111. In the area E110, buttons for selecting use of the ACS function or manual setting of the color mode are displayed. In the area E111, buttons for, when the ACS function determines that the document is a black-and-white (achromatic color) document, making another selection between automatic determination using the image processing apparatus 10 and manual setting, as to whether the document is a gray-scale document or a black-and-white binary document are displayed. The OK button B111 is used to confirm the settings. On the screen, a button on which "Automatic mode" is displayed has been selected in the area E110. Thus, the ACS function is made effective. In this state, a black-and-white automatic mode button B110, which causes the image processing apparatus 10 to determine whether the document is a gray-scale document or a black-and-white binary document, in the area E111 is selected. In this case, the following function may be provided: the image processing apparatus 10 determines whether an image obtained by reading the document is to be output in the gray-scale mode or the black-and-white binary mode; the image is converted, for output, into the number of gradations which has been set on the basis of the determination result.

In addition, the allowable level for information loss due to binarization is different depending on users. Therefore, while a certain user obtains their desired determination result from the image processing apparatus 10, a different user may not obtain their desired determination result from the image processing apparatus 10. That is, the opposite determination, such as unintended gray-scaling or black-and-white binarization, may be made. A way to change the determination criterion is to be provided in order to make the determination result closer to a user's desired one.

Figure 8:
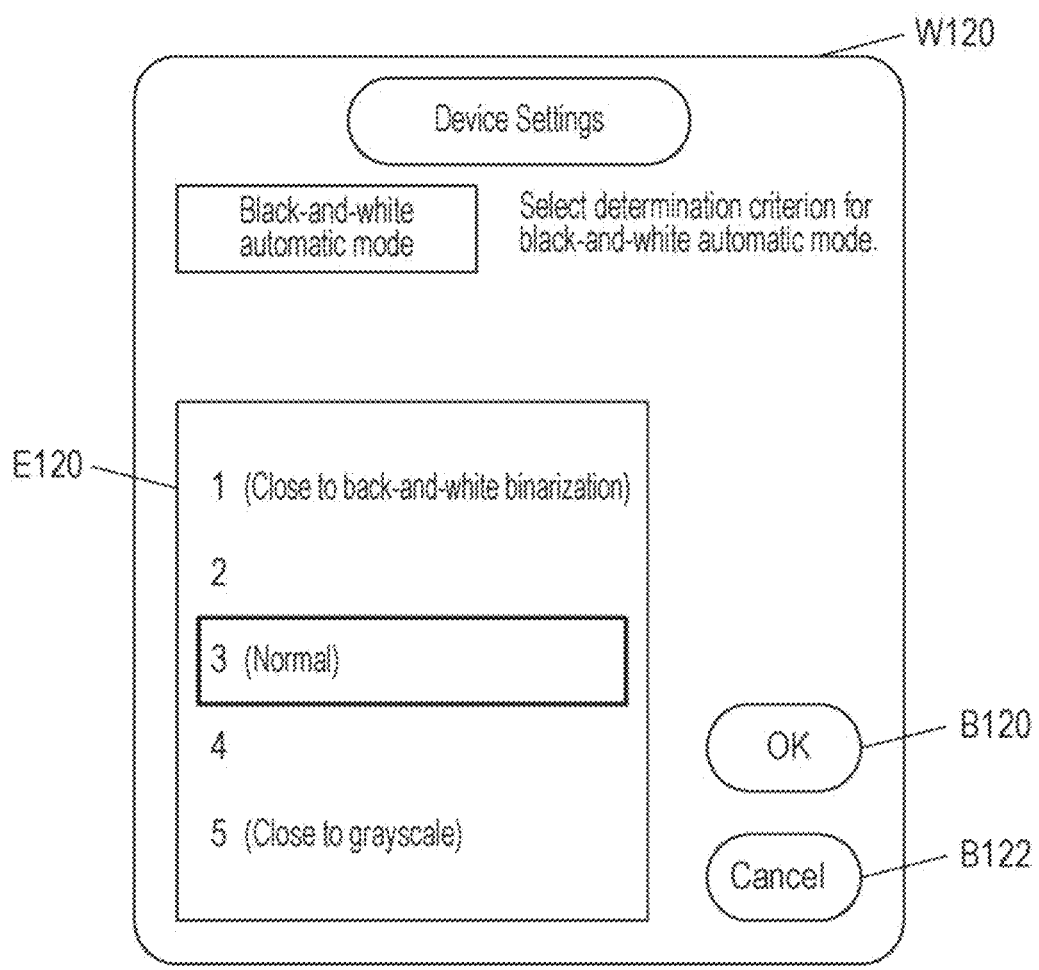
FIG. 8 is a diagram illustrating an exemplary determination-criterion setting screen according to the first embodiment.

FIG. 8 illustrates an exemplary setting screen W120 (determination-criterion setting screen) for changing the determination criterion. This screen is displayed, for example, by a user selecting "determination criterion settings" from "device settings" in a menu (not illustrated) displayed on the display unit after selection of the other-setting button B105 in the setting screen W100 in FIG. 6.

As illustrated in FIG. 8, the setting screen W120 includes a list area E120, an OK button B120, and a Cancel button B122. The list area E120 is used to select the determination criterion. The OK button B120 is used to confirm the settings. The Cancel button B122 is used to discard the settings and return to the setting screen W100. A user selects one determination criterion in the list area E120, and presses the OK button B120. Thus, the image processing apparatus 10 updates the determination criterion for a statistic with the selected determination criterion. Under the assumption that the determination criterion may be selected from five stages, the description will be made below.

In the initial state, a setting is made so that whether gray scaling or black-and-white binarization is to be performed is determined without a noticeable bias. Therefore, for example, the third level, "normal", which is located at the center position among the five stages has been set. The criterion value for a statistic in the case of "normal" is set by a designer appropriately.

If, under this setting, for example, a document which is to be determined to be a gray-scale document has been determined as a black-and-white binary document, a level, such as "4" or "5", which is located on the "5 (close to grayscale)" side in the setting screen is selected. Thus, the document may be easily determined as a gray-scale document. When "4" or "5" is selected as the determination criterion, the image processing apparatus 10 makes the criterion value for a statistic lower than the criterion value used in the case where the determination criterion is "3". Thus, even the information-loss evaluation values, with which the document is determined as a black-and-white binary document when the determination criterion is "3", may serve as values with which the document is determined as a gray-scale document.

In contrast, if a document which is to be determined as a black-and-white binary document has been determined as a gray-scale document, a level, such as "2" or "1", which is located on the "1 (close to black-and-white binarization)" in the setting screen is selected. Thus, the document may be easily determined as a black-and-white binary document. When "2" or "1" is selected as the determination criterion, the image processing apparatus 10 makes the criterion value for a statistic higher than the criterion value used in the case where the determination criterion is "3". Thus, even the information-loss evaluation values, with which the document is determined as a gray-scale document when the determination criterion is "3", may serve as values with which the document is determined as a black-and-white binary document.

Figure 10:
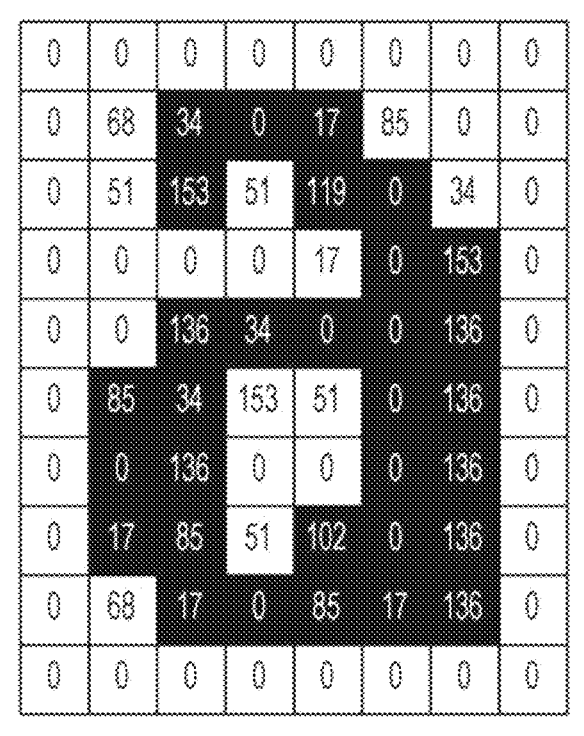

Referring to FIGS. 9A to 10, the first evaluation image, the second evaluation image, and the difference image data will be described. FIG. 9A is a diagram illustrating an alphabetical lowercase character, "a", in an area having 10 pixels vertically and eight pixels horizontally. Thus, when the input image data indicates a black-and-white (achromatic color) document, the image having been subjected to the preprocessing serves as a first evaluation image. FIG. 9B illustrates the gradation values in FIG. 9A. In the description about exemplary operations, the number of gradations of the first evaluation image is 256, and each gradation value is any integer value from 0 to 255.

FIG. 9C illustrates an image obtained by performing binarization in such a manner that, among the gradation values in FIG. 9B, the gradation values, which are equal to or less than 153, of the pixels are set to zero; the gradation values, which are equal to or more than 154, of the pixels are set to one. Thus, an image having the number of gradations smaller than the number of gradations of the first evaluation image serves as a second evaluation image. FIG. 9D is a diagram obtained by performing normalization in such a manner that the gradation value of each pixel of the second evaluation image is multiplied by 255. For each pixel, the difference value between the value in FIG. 9D and the gradation value in FIG. 9B is calculated. Thus, the output-gradation-number setting circuit 16 generates the difference image data.

FIG. 10 illustrates exemplary difference image data. FIG. 10 is a diagram illustrating the difference values, each of which indicates the absolute value of the value obtained for the corresponding pixel by subtracting the corresponding gradation value in FIG. 9B from the corresponding value in FIG. 9D, at the respective pixel positions. As illustrated in FIGS. 9A to 9D, as a pixel has a color closer to halftone color (gray), the difference value is larger.

The integrated value of the difference values in FIG. 10 is 2553, and the average is 31.9125. When the average of the absolute values of the difference values is used as the statistic, for example, if the criterion value is 50, the statistic is lower than the criterion value. Therefore, the output-gradation-number setting circuit 16 determines that information loss produced through binarization is small, and sets the number of output gradations to two. In contrast, if the criterion value is 30, the statistic is equal to or higher than the criterion value. Therefore, the output-gradation-number setting circuit 16 determines that information loss produced through binarization is large, and sets the number of output gradations to 256.

As described above, a user may set the criterion value in the determination-criterion setting screen W120. Therefore, if the criterion value is set to 50 when the determination criterion level is "3", and if the criterion value is set to 30 when the determination criterion level is "5", an image which is output by using the user settings is made different in accordance with the determination criterion setting.

According to the first embodiment, it may be determined whether an achromatic color document is to be output as a black-and-white binary document or a gray-scale document, on the basis of the information-loss evaluation values obtained by converting the information loss into numbers. Thus, even for a document having a large amount of text data, if loss, due to binarization, in information transmitted to a user is large, the document may be output as a gray-scale document, enabling the information loss for the user to be suppressed. In contrast, if the document may be output as a black-and-white binary document, the document may be output after binarization. As a result, in accordance with input data, the toner amount consumed by an image forming apparatus or the transfer data amount may be controlled when output image data is output.

2. Second Embodiment

A second embodiment will be described. In the second embodiment, in addition to the first embodiment described above, an image area of the input image data is classified as a first image area or a second image area, and the feature values for first image areas are emphasized. Thus, the number, which is appropriate, of output gradations is determined and set with higher accuracy.

The differences between the first embodiment and the second embodiment will be described. The common points to the first embodiment will not be described.

Figure 11:
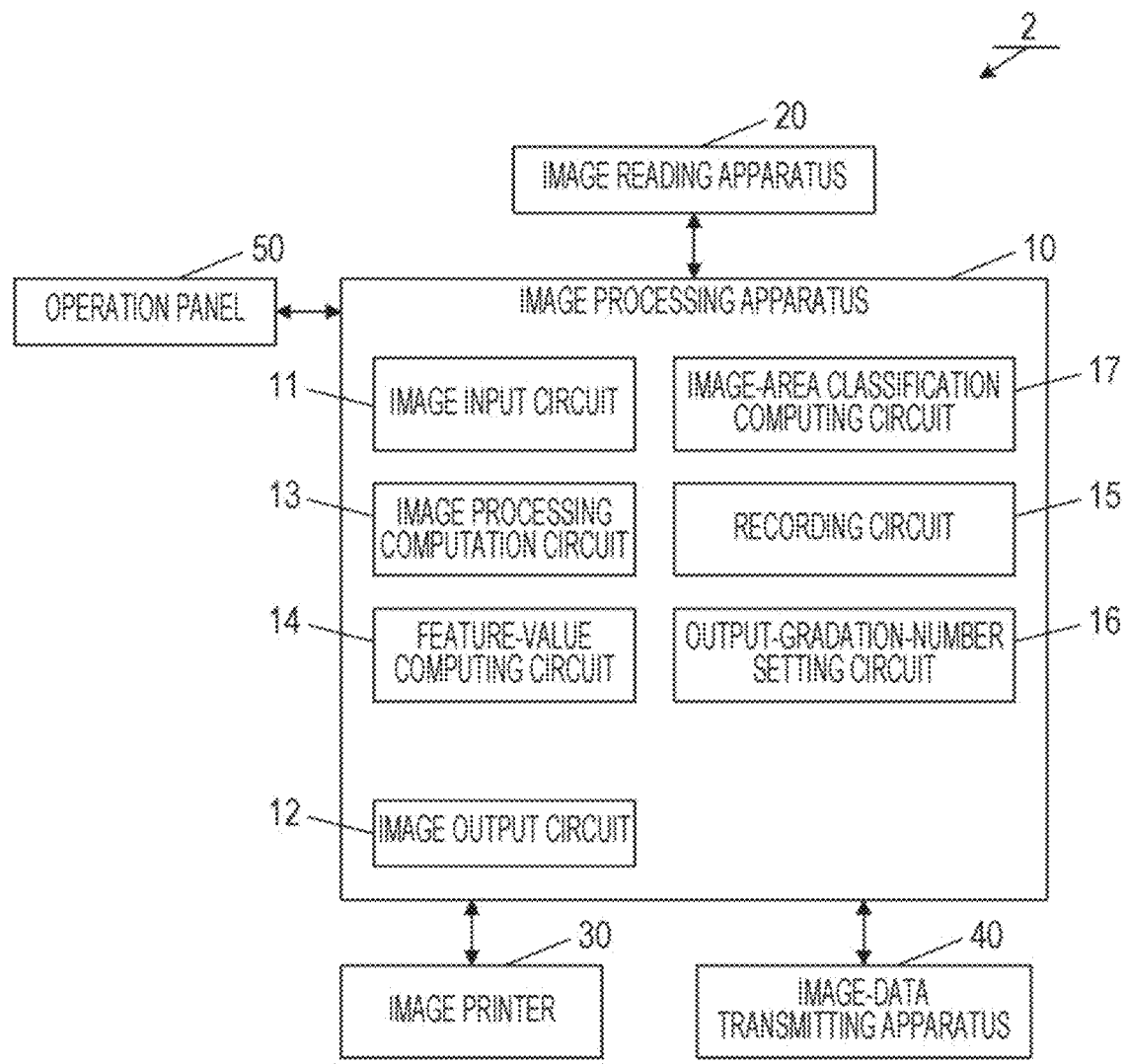
FIG. 11 is a diagram for describing the functional configuration of an image processing apparatus according to a second embodiment.

FIG. 11 is a block diagram illustrating the functional configuration of an image forming apparatus 2 according to the second embodiment. As illustrated in FIG. 11, the different point is that, other than the configuration of the image forming apparatus 1 according to the first embodiment, the image forming apparatus 2 further includes an image-area classification computing circuit 17.

The image-area classification computing circuit 17 performs computation for classifying areas in an image into multiple areas having attributes including the first image area and the second image area, on the basis of the characteristics of the image data. In the example in the second embodiment, the first image area indicates a character area, and the second image area indicates a photograph area. However, this is not limiting.

Figure 12:
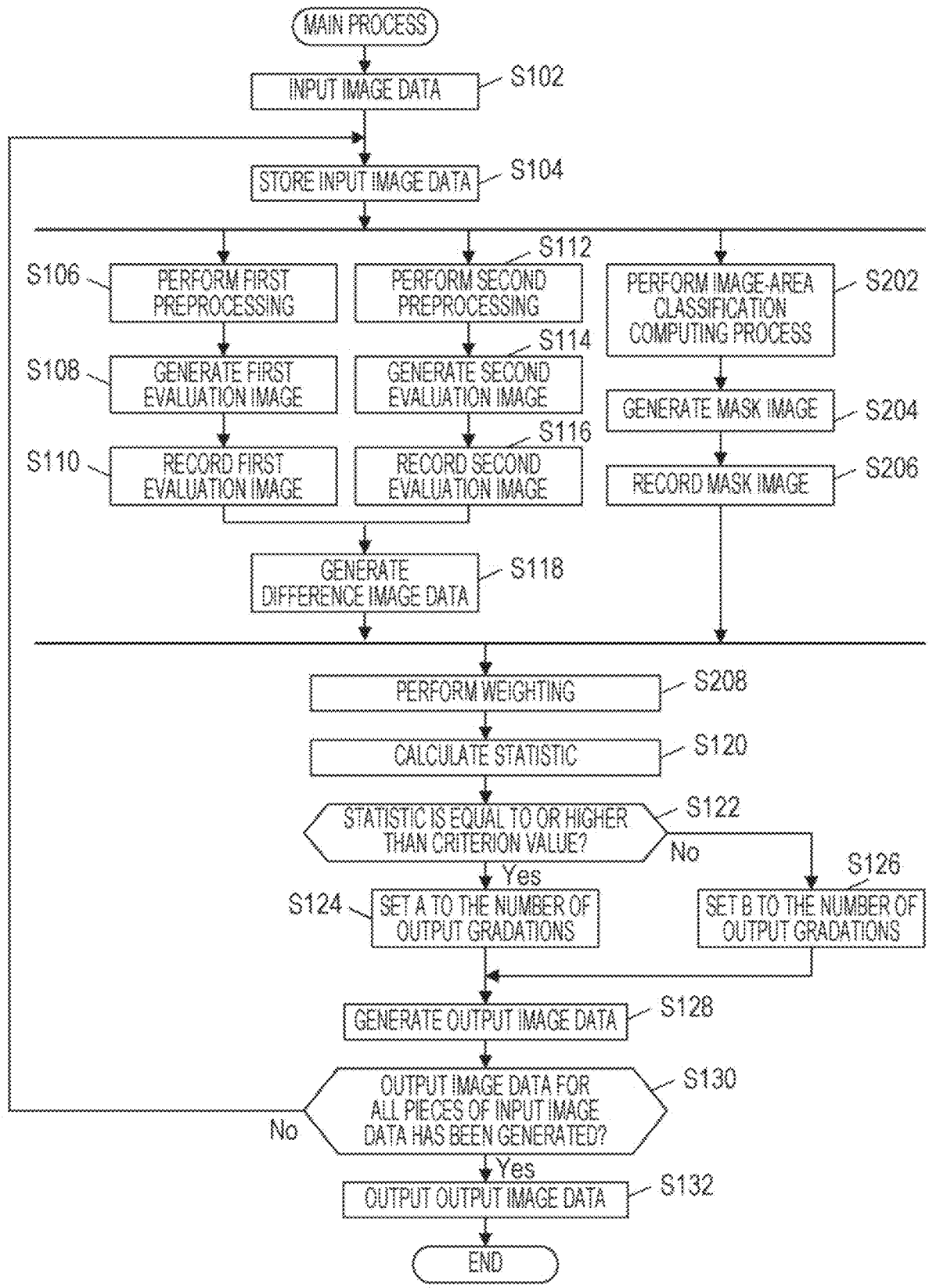
FIG. 12 is a flowchart for describing a process according to the second embodiment.

The flow of the process according to the second embodiment will be described by referring to FIG. 12. The process performed by the image-area classification computing circuit 17 is done in parallel with the process from step S106 to step S118 described in the first embodiment. An image-area classification computing process of classifying the areas in an image into multiple areas including the first image area and the second image area, on the basis of the input image is performed (step S202). As preparation for the image-area classification computing process, the preprocessing as described in the first embodiment may be performed. As the method of the image-area classification computing process, for example, a technique disclosed in Japanese Unexamined Patent Application Publication No. 2012-114744 (hereinafter referred to as the "cited document") may be used. According to the technique disclosed in the cited document, image data is divided into pixel blocks. It is determined whether or not each pixel block is a foreground pixel block forming a foreground of the image. A foreground area in which foreground pixel blocks are continuously arranged may be extracted. In accordance with the distance, the directional distance, and the direction between multiple foreground areas, a string area forming of multiple foreground areas may be extracted. Therefore, the cited document may be used to extract foreground areas from areas in an image, and to use the other areas as background areas, achieving classification of the image area. String areas may be extracted from the foreground areas, and may be used as character areas. The other areas in the foreground areas may be classified as photograph areas. That is, the technique disclosed in the cited document may be used to classify areas in an image into three areas, a background area, a character area, and a photograph area. The details are described in the cited document, and will not be described.

The image-area classification computing circuit 17 generates mask image data obtained through classification of areas in an image into three areas, a background area, a character area, and a photograph area (step S204). A concrete example of the mask image data is image data for which the pixel count is the same as those of the first evaluation image and the second evaluation image, and which has three gradations obtained by the following manner: zero as a code is assigned to the values of the pixels of the background areas; one as a code is assigned to the values of the pixels of the character areas; two as a code is assigned to the values of pixels in the photograph areas. The generated mask image data is recorded in the recording circuit 15 (step S206).

For the gradation value of each pixel in the difference image data generated in step S118 described in the first embodiment, the output-gradation-number setting circuit 16 performs weighting by using the mask image data (step S208). The weighting is performed in the following manner: in each image area obtained through classification performed by the image-area classification computing circuit 17, multiplication is performed by using a magnification coefficient so that the feature values of the pixels in an image area, which causes serious information loss, are made large. For example, among the three types, that is, the background area, the character area, and the photograph area, the seriousness of information loss in the background area is low. Therefore, a small magnification coefficient is set. In contrast, information loss in the character area gives such a serious influence that a small amount of information loss makes characters illegible. Therefore, such information loss is highly serious, and a large magnification coefficient is set. For the photograph area, an intermediate magnification coefficient between these is set.

Thus, the mask image data is used to multiply difference image data by a different magnification coefficient in accordance with the type of the image area, and to emphasize highly serious information loss.

In the subsequent processes, a similar determination process to the first embodiment is performed. According to the second embodiment, information loss in the character area which is particularly serious may be determined more sensitively, avoiding distortion of characters suitably.

3. Third Embodiment

In the first embodiment, the method of calculating a statistic based on the difference between multiple evaluation images expressed by using different numbers of gradations, and of setting the number, which is appropriate, of output gradations by comparing the statistic with the criterion value is described. In a third embodiment, as another method, a method of determining whether or not, for each pixel in the entire difference image data, the pixel satisfies a given criterion on the basis of the gradation value, and of setting the number of output gradations on the basis of the number of pixels, which are determined to satisfy the given criterion, in the entire evaluation image will be described. The third embodiment is similar to the first embodiment except the method of determining the number, which is appropriate, of output gradations.

Figure 13:
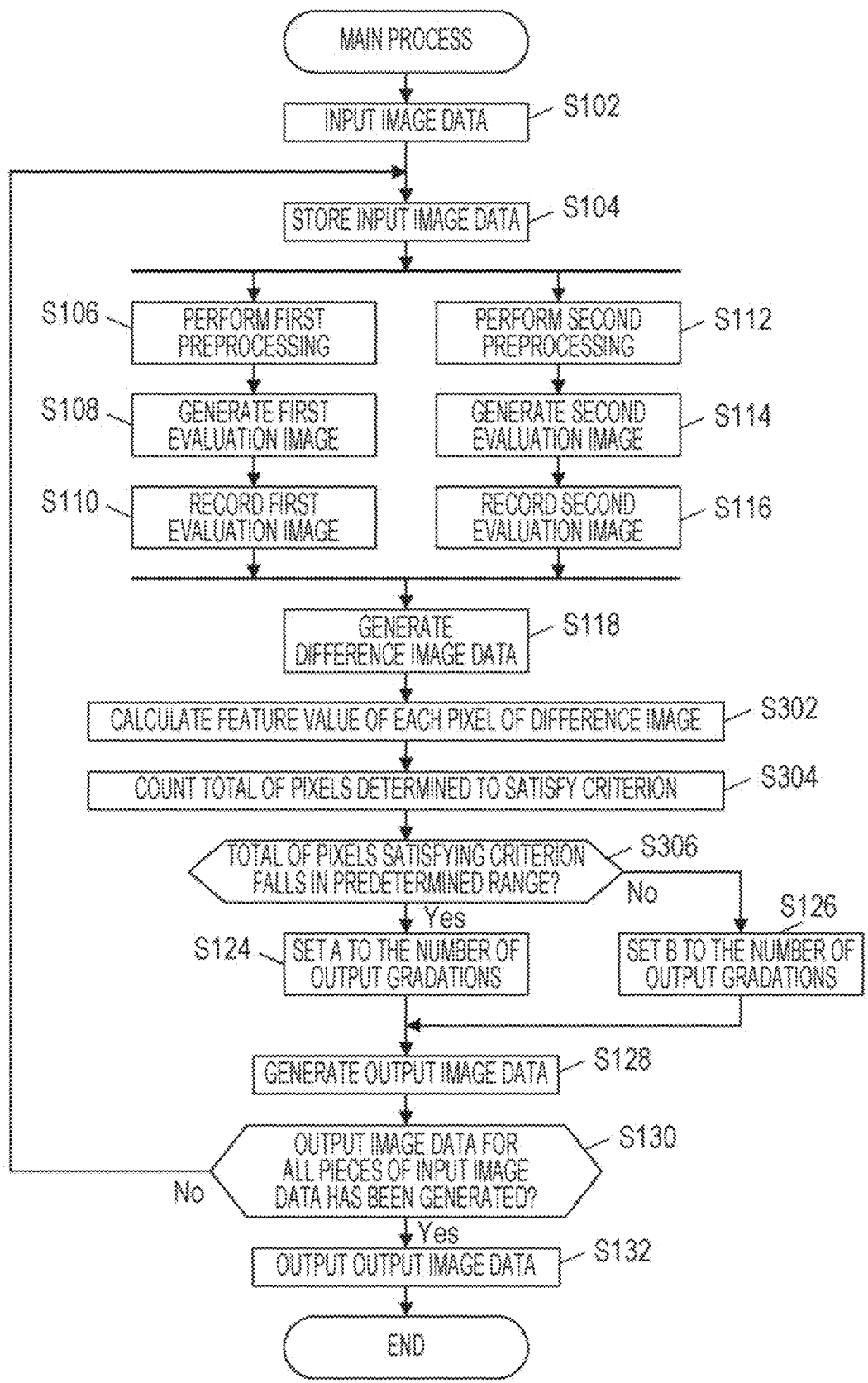
FIG. 13 is a flowchart for describing a process according to a third embodiment.

The flow of the process according to the third embodiment will be described by referring to FIG. 13. In the third embodiment, first, the output-gradation-number setting circuit 16 calculates the feature value of each pixel of the entire difference image data (step S302). For example, the feature value is calculated on the basis of the gradation value of each pixel in the difference image data. If the feature value is equal to or higher than a given criterion value, the output-gradation-number setting circuit 16 determines that the pixel does not satisfy the given criterion. If the feature value is lower than the given criterion value, the output-gradation-number setting circuit 16 determines that the pixel satisfies the given criterion. A pixel determined not to satisfy the given criterion means that the pixel has a large information loss.

The output-gradation-number setting circuit 16 counts the total number of pixels determined to satisfy the given criterion in step S302 (step S304). It is determined whether or not the total number of pixels satisfying the criterion falls in a predetermined range (step S306). If the total number of pixels satisfying the criterion falls in the predetermined range, it is determined that it is not suitable to set the number of gradations of the second evaluation image as the number of output gradations. The number of gradations of the first evaluation image (for example, the number of gradations, 256, which is the value of A) is set as the number of output gradations (from Yes in step S306 to step S124). If the total number of pixels satisfying the criterion does not fall in the predetermined range, it is determined that it is suitable to set the number of gradations of the second evaluation image as the number of output gradations. The number of gradations of the second evaluation image (for example, the number of gradations, two, which is the value of B) is set as the number of output gradations (from No in step S306 to step S126).

The criterion value for the feature values of pixels and the predetermined range for the total number of pixels satisfying the criterion may be set in advance, or may be set by a user. A criterion range may be determined instead of the criterion value for the feature values of pixels. Depending on whether or not the feature value of a pixel falls in the criterion range, it may be determined whether or not the pixel satisfies the predetermined criterion. Alternatively, a criterion value for the total number of pixels satisfying the criterion may be set. Depending on whether or not the total number of pixels satisfying the criterion is equal to or higher than the criterion value, the number of output gradations may be set.

In the third embodiment, the total number of pixels determined to satisfy the predetermined criterion is counted. Alternatively, the total number of pixels determined not to satisfy the predetermined criterion may be counted. Depending on whether or not the counted total number falls in a given range, the number of output gradations may be set.

4. Fourth Embodiment

In the first embodiment, the following method is described: on the basis of a difference image obtained from the differences between evaluation images expressed by using different numbers of gradations, a statistic corresponding to the entire single difference image is calculated; the number, which is appropriate, of output gradations is determined by comparing the statistic with a criterion value; the determined number is set. In a fourth embodiment, the following method will be described: the entire difference image data is divided into multiple image blocks each including multiple pixels; it is determined whether or not each image block satisfies a given condition on the basis of a statistic calculated for each image block; the number of output gradations is set on the basis of the total number of image blocks determined to satisfy the given criterion. An image block is, for example, a rectangular area having a given size. An image block may be a circular area or a rhombic area. One pixel may belong to multiple image blocks.

Figure 14:
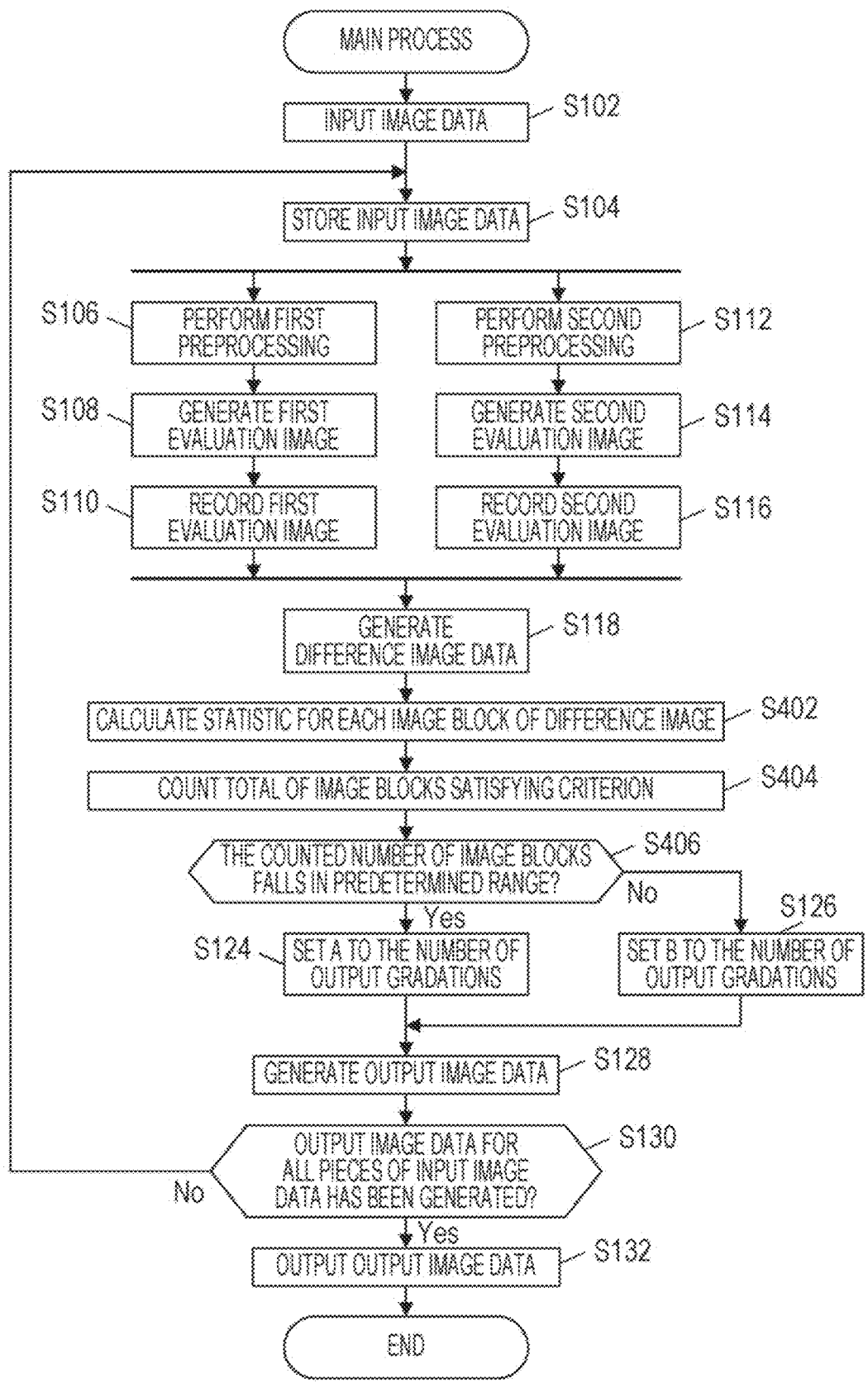
FIG. 14 is a flowchart for describing a process according to a fourth embodiment.

The flow of the process according to the fourth embodiment will be described by referring to FIG. 14. In the fourth embodiment, first, the output-gradation-number setting circuit 16 divides the entire difference image data into multiple image blocks on the basis of a given setting condition recorded in a recording circuit. Then, the output-gradation-number setting circuit 16 calculates a statistic for each image block on the basis of the feature values of the multiple pixels included in the image block (step S402). The setting condition is information about the number of image block divisions and a division method. The image blocks are obtained through the division so as to each have multiple pixels. The output-gradation-number setting circuit 16 then determines whether or not each image block satisfies the given criterion on the basis of the statistic of the image block. The output-gradation-number setting circuit 16 counts the total number of image blocks satisfying the given criterion, in the entire image (step S404). As the determination method, a method similar to the determination method based on the statistic of the entire image which is described in the first embodiment may be used. That is, the difference from the first embodiment is that, in the first embodiment, the determination is performed on the entire image on the basis of the statistic of the entire image, while, in the fourth embodiment, the determination is performed on each image block on the basis of the statistic of the image block. Other than this, the same techniques may be used.

The output-gradation-number setting circuit 16 determines whether or not the number of image blocks counted in step S404 falls in a predetermined range (step S406). If the number of image blocks satisfying the given criterion falls in the predetermined range, it is determined that it is not suitable to set the number of gradations of the second evaluation image as the number of output gradations. The number of gradations of the first evaluation image (for example, the number of gradations, 256, which is the value of A) is set as the number of output gradations (from Yes in step S406 to step S124). If the number of image blocks satisfying the given criterion does not fall in the predetermined range, it is determined that it is suitable to set the number of gradations of the second evaluation image as the number of output gradations. The number of gradations of the second evaluation image (for example, the number of gradations, two, which is the value of B) is set as the number of output gradations (from No in step S406 to step S126).

The criterion value for the statistics of image blocks and the predetermined range for the total number of image blocks satisfying the criterion may be set in advance or may be set by a user. Instead of the criterion value for the statistics of image blocks, a criterion range may be determined. Depending on whether or not the statistic of an image block falls in the criterion range, it may be determined whether or not the given criterion is satisfied. Alternatively, a criterion value for the total number of image blocks satisfying the criterion may be determined. Depending on whether or not the total number of image blocks satisfying the criterion is equal to or higher than the criterion value, the number of output gradations may be set.

In the fourth embodiment, the total number of image blocks determined to satisfy the given criterion is counted. The total number of image blocks determined not to satisfy the given criterion may be counted. Depending on whether or not the counted total number falls in a given range, the number of output gradations may be set.

The fourth embodiment may be considered as an intermediate approach between the first embodiment and the third embodiment. This will be described below. In the technique according to the first embodiment, the determination is performed on the entire image on the basis of the statistic calculated from the entire image. Thus, regardless of the magnitudes of the degrees of individual information losses occurring in an image and the denseness or sparseness of the distribution of the occurrence positions, the degree of information loss is quantified as an average value over the entire image. Therefore, even when an information loss occurs locally in the entire image, if, in the area other than this, a large degree of information loss is not recognized, the technique according to the first embodiment has a disadvantage that such a local information loss is difficult to determine. In contrast, the technique according to the first embodiment has an advantage that, since the average amount of the magnitudes of information losses in the entire image is determined, an influence from noise is hardly received. The technique according to the third embodiment is opposite to the technique according to the first embodiment. In the technique according to the third embodiment, the determination is performed on the basis of the statistic calculated for each pixel. In accordance with the number of pixels satisfying the predetermined condition, the number of output gradations is set. Therefore, the technique according to the third embodiment has an advantage that information about information losses in local areas may be reflected strongly.

Typically, image data may often include noise of a pixel size. There are various reasons for the noise. An example of the reasons is CCD output noise produced when the image reading apparatus 20 reads an image from a document optically. Therefore, in addition to information about information loss that is intended to be determined, information about information loss in such a local area includes many pieces of information caused by such noise. That is, there is a disadvantage that an influence from noise is easily received. The fourth embodiment employs the intermediate approach between the first embodiment and the third embodiment as described above. The way of dividing the entire image into image blocks (for example, the degree of minuteness in the division) is optimized. Thus, an influence from noise may be suppressed, and information about information loss in a local area is determined correctly.

5. Fifth Embodiment

In a fifth embodiment, a grouping technique employed in the technique according to the third embodiment (the determination method on each pixel) or the fourth embodiment (the determination on each image block) will be described. The grouping technique is used as a technique for suppressing an influence from noise.

In the fifth embodiment, the output-gradation-number setting circuit 16 determines a pixel group or an image block group, in which multiple pixels or multiple image blocks determined to satisfy the given criterion are continuously adjacent to each other, as a single cluster. That is, a clustering process (grouping process) is performed in which, when there are two or more adjacent and continuous pixels or image blocks obtained through the determination, these are grouped as a single cluster. If there are no adjacent pixels or image blocks, a single pixel or image block is regarded as a single cluster. The number of clusters based on the grouping process is used to set the number of output gradations.

Figure 15:
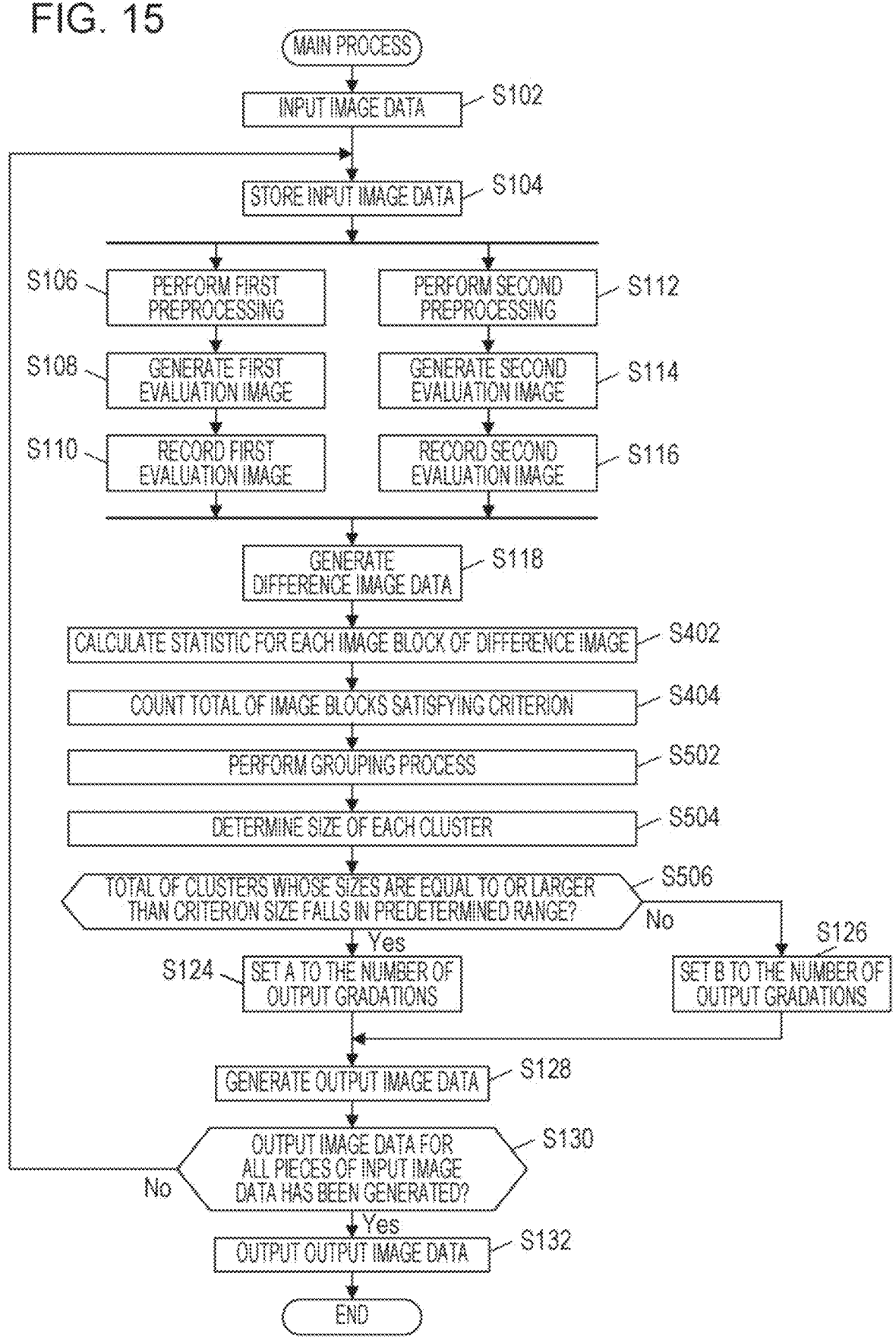
FIG. 15 is a flowchart for describing a process according to a fifth embodiment.

The flow of the process according to the fifth embodiment will be described by referring to FIG. 15. FIG. 15 is a flowchart of the grouping process on image blocks. First, the output-gradation-number setting circuit 16 performs the clustering process (grouping process) in which an image block group, in which image blocks determined to satisfy the given criterion in step S404 are adjacent to each other, is regarded as a single cluster (step S502).

If pixels, instead of image blocks, are grouped, the processes in step S302 and step S304, instead of step S402 and step S404 in FIG. 15, are performed, and pixels satisfying the given criterion are determined. In step S502, the clustering process (grouping process) in which a pixel group, in which pixels satisfying the criterion are adjacent to each other, is regarded as a single cluster is performed.

The output-gradation-number setting circuit 16 then determines the size of each determined cluster (step S504). The size of each cluster may be evaluated as the number of pixels or image blocks included in the cluster. In this case, the size (also referred to as a run-length) of a cluster is expressed by using a numeric value equal to or more than one.

Figure 16A:
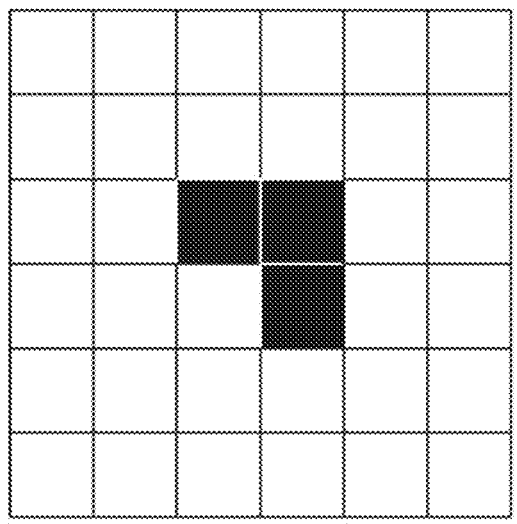
FIGS. 16A to 16D are diagrams illustrating cluster examples according to the fifth embodiment.
Figure 16B:
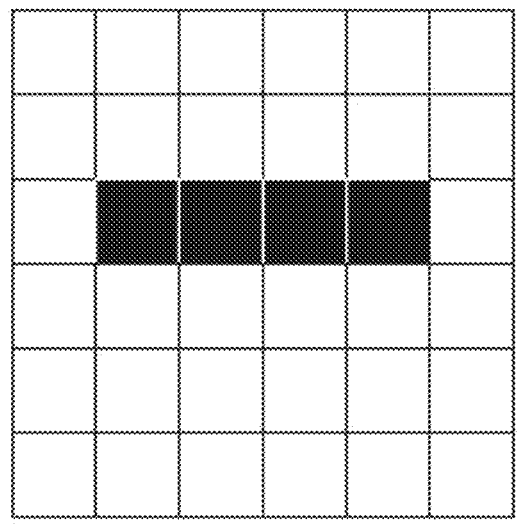
Figure 16C:
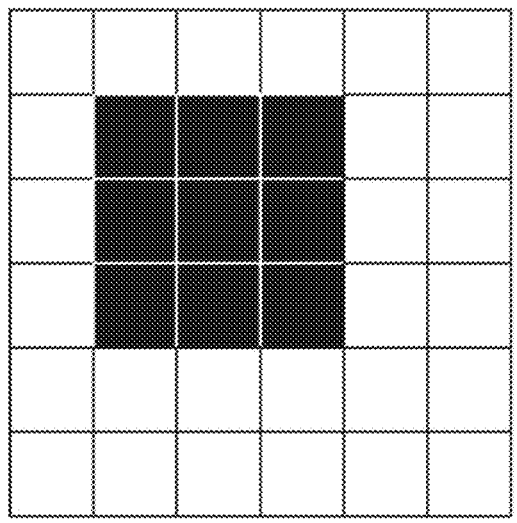
Figure 16D:
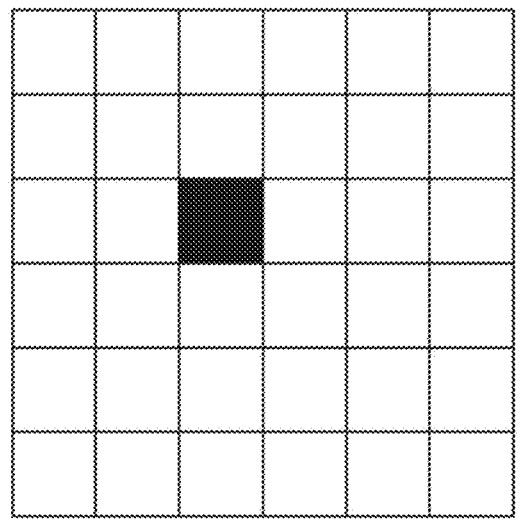

The process described above will be described by using FIGS. 16A to 16D. FIGS. 16A to 16D illustrate difference image data in such a manner that a pixel determined to satisfy the given criterion is illustrated in black; a pixel determined not to satisfy the given criterion is illustrated in white. In FIG. 16A, there are three adjacent and continuous pixels determined to satisfy the given criterion. In this case, grouping is performed so that the three pixels are regarded as a single cluster. A single cluster having a size of three is regarded as being present. Similarly, in FIG. 16B, a single cluster having a size of four is regarded as being present; in FIG. 16C, a size of nine; in FIG. 16D, a size of one.

The output-gradation-number setting circuit 16 then counts the total number of clusters having sizes equal to or larger than a given criterion size. The output-gradation-number setting circuit 16 determines whether or not the total number of clusters having sizes equal to or larger than the given criterion size falls in a predetermined range (step S506). If the total number of clusters having sizes equal to or larger than the given criterion size falls in the predetermined range, it is determined that it is not suitable to set the number of gradations of the second evaluation image as the number of output gradations. The number of gradations of the first evaluation image (for example, the number of gradations, 256, which is the value of A) is set as the number of output gradations (from Yes in step S506 to step S124). If the total number of clusters does not fall in the predetermined range, it is determined that it is suitable to set the number of gradations of the second evaluation image as the number of output gradations. The number of gradations of the second evaluation image (for example, the number of gradations, two, which is the value of B) is set as the number of output gradations (from No step S506 to step S126). For example, if the criterion size for the cluster size is three, clusters having sizes equal to or less than two are not counted, and the total number of clusters having sizes equal to or greater than three are counted.

The criterion size and the predetermined range for the total number of clusters having sizes equal to or larger than the given criterion size may be set in advance or may be set by a user. In the fifth embodiment, the grouping process is performed on the basis of pixels or image blocks determined to satisfy the given criterion. Alternatively, the grouping process may be performed on the basis of pixels or image blocks determined not to satisfy the given criterion.

According to the fifth embodiment, clusters having sizes smaller than the predetermined criterion are excluded from counting for the total number. Therefore, the number of output gradations may be determined correctly by excluding information losses just in local areas, such as a small cluster produced accidentally through the determination because the pixels in the cluster change differently from the surrounding pixels due to an influence from noise.

6. Modified Examples

The present disclosure may be applied to a digital copier. In addition, the present disclosure may be applied also to a digital color multi-function device having a copy function, a printer function, a facsimile transmitting function, a scan to e-mail function, and the like. The digital color multi-function device may further include, for example, a communication device formed of a modem or a network card. When facsimile transmission is to be performed, the communication device uses the modem to perform the following operations. After a transmission procedure is performed with a target and a transmittable state is established, the communication device reads image data (image data read by using a scanner), which is compressed in a given format, from a memory, performs processes such as change of the compression format, and transmits the data to the target through a communication line sequentially.

When a facsimile is received, a CPU receives image data transmitted from a target, while performing communication procedures. The CPU inputs the received data in the image processing apparatus which uses a compression/expansion processor (not illustrated) to expand the received image data. The expanded image data is subjected to a rotation process and a resolution conversion process when appropriate. The resulting data is subjected to output gradation correction and a gradation reproducing process, and is output from the image printer 30.

In addition, data communication is performed with a computer or another digital multi-function device connected over a network through a network card or a local-area network (LAN) cable.

A color multi-function device is described above. A monochrome multi-function device may be used. The present disclosure may be regarded as a computer-readable recording medium in which a program for causing a computer to execute a process is recorded. The computer-readable recording medium is used to record a method for the image processing apparatus described above receiving an image, which is obtained by photographing a target with a background, and extracting image data corresponding to only the area of the target.

As a result, a recording medium in which program codes (an executable-format program, an intermediate-code program, or a source program) for performing the process described above are recorded may be provided in a portable manner. In the embodiment, a memory (not illustrated) for a microcomputer performing the process, for example, a read-only memory (ROM), itself may be a program medium serving as the recording medium. Alternatively, a program medium may be provided in the following manner. A program reading apparatus may be provided as an external storage device (not illustrated). The program medium is readable by inserting the recording medium into the program reading apparatus.

In either case, the stored program may be accessed and executed by a microprocessor. Alternatively, in either case, program codes may be read; the read program codes may be downloaded in a program storage area (not illustrated) in a microcomputer; the program may be executed. The download program is assumed to be stored in a body unit in advance. The program medium described above, which is a recording medium formed separately from the body, may be a medium carrying program codes permanently, such as a tape, for example, a magnetic tape or a cassette tape, a disk, for example, a magnetic disk (such as a flexible disk or a hard disk), or an optical disk (such as a compact disc-read-only memory (CD-ROM), a magneto-optical (MO) disk, a minidisc (MD), or a digital versatile disk (DVD)), a card, for example, an integrated circuit (IC) card (including a memory card) or an optical card, or a semiconductor memory, for example, a mask ROM, an erasable programmable read only memory (EPROM), an electrically erasable programmable read only memory (EEPROM), or a flash ROM.

The embodiment employs a system configuration in which a communication network including the Internet is connectable. Therefore, the embodiment may be implemented as a medium carrying program codes temporarily in such a manner that the program codes are downloaded from the communication network. In the case where a program is thus downloaded from the communication network, the download program may be stored in the body unit in advance or may be installed in a different recording medium. The present disclosure may be implemented in a form of computer data signals embedded in a carrier. In this form, the program codes are embodied in electronic transmission.

The recording medium described above is read by a program reading apparatus included in an image processing apparatus. Thus, the image processing method described above is performed.

The present disclosure contains subject matter related to that disclosed in Japanese Priority Patent Application JP 2018-129080 filed in the Japan Patent Office on Jul. 6, 2018, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus which processes input image data and generates output image data, the image processing apparatus comprising:
a feature-value calculating unit that calculates a feature value from the input image data;
an output-gradation-number setting unit that sets, as a number of output gradations, any one gradation number of a plurality of candidates for the number of output gradations based on the feature value calculated by the feature-value calculating unit; and
an image processor that processes the input image data and that generates the output image data having the number of output gradations which is set by the output-gradation-number setting unit,
wherein the feature-value calculating unit calculates, as the feature value, an information-loss evaluation value produced if the output image data is generated, and
wherein the output-gradation-number setting unit sets the number of output gradations based on the information-loss evaluation value.

2. The image processing apparatus according to claim 1, further comprising:
an image area classifying unit that classifies one or more image areas of the input image data into a plurality of areas including at least a first image area and a second image area, and
wherein the output-gradation-number setting unit performs an emphasis process in which the feature value of the first image area is emphasized compared with the feature value of the second image area, and sets the number of output gradations.

3. The image processing apparatus according to claim 2, wherein the emphasis process is performed in such a manner that the feature value of the first image area is multiplied by a magnification coefficient larger than a coefficient for the feature value of the second image area.

4. The image processing apparatus according to claim 2, wherein the first image area is a character area.

5. An image processing apparatus which processes input image data and generates output image data, the image processing apparatus comprising:
a feature-value calculating unit that calculates a feature value from the input image data,
an output-gradation-number setting unit that sets, as a number of output gradations, any one gradation number of a plurality of candidates for the number of output gradations based on the feature value calculated by the feature-value calculating unit; and
an image processor that processes the input image data and that generates the output image data having the number of output gradations which is set by the output-gradation-number setting unit,
wherein the feature-value calculating unit uses, as a first evaluation image, the input image data itself or image data newly generated by performing given image processing on the input image data,
wherein the feature-value calculating unit generates a second evaluation image whose number of gradations is less than the number of gradations of the first evaluation image, based on the input image data itself or image data newly generated by performing the identical given image processing or other given image processing on the input image data, and
wherein the feature-value calculating unit calculates the feature value based on a difference between the first evaluation image and the second evaluation image.

6. The image processing apparatus according to claim 5, wherein the given image processing includes outline extraction processing for extracting an edge portion of an image in the input image data.

7. The image processing apparatus according to claim 5, wherein the feature-value calculating unit generates difference image data by calculating difference values between pixel values of the first evaluation image and pixel values of the second evaluation image, the difference values being calculated for the respective pixels, and wherein the output-gradation-number setting unit sets the number of output gradations based on a statistic of the difference values for the pixels in the entire difference image data.

8. The image processing apparatus according to claim 7, wherein the statistic is an amount reflecting a total magnitude or a magnitude of variation of the difference values in the entire difference image data.

9. The image processing apparatus according to claim 5, wherein the feature-value calculating unit generates difference image data by calculating difference values between pixel values of the first evaluation image and pixel values of the second evaluation image, the difference values being calculated for the respective pixels,
wherein the output-gradation-number setting unit determines whether or not, for each pixel in the difference image data, the corresponding difference value satisfies a given criterion, and
wherein the output-gradation-number setting unit sets the number of output gradations based on a number of pixels determined to satisfy the given criterion in the entire difference image data.

10. The image processing apparatus according to claim 9, wherein the output-gradation-number setting unit performs a grouping process in which a pixel group is determined as a single cluster, the pixel group being a group in which more than one of the pixels determined to satisfy the given criterion are continuously adjacent, and
wherein the output-gradation-number setting unit sets the number of output gradations based on a number of clusters having sizes equal to or larger than a given criterion among the one or more clusters.

11. The image processing apparatus according to claim 5, wherein the feature-value calculating unit generates difference image data by calculating difference values between pixel values of the first evaluation image and pixel values of the second evaluation image, the difference values being calculated for the respective pixels,
wherein the output-gradation-number setting unit divides the entire difference image data into a plurality of image blocks, each of the plurality of image blocks having a plurality of pixels,
wherein the output-gradation-number setting unit determines whether or not each image block satisfies a given criterion based on a statistic of the difference values for the plurality of pixels included in the image block, and
wherein the output-gradation-number setting unit sets the number of output gradations based on a number of image blocks determined to satisfy the given criterion in the entire difference image data.

12. The image processing apparatus according to claim 11,
wherein the statistic is an amount reflecting a total magnitude or a magnitude of variation of the difference values of the plurality of pixels included in the image block.

13. The image processing apparatus according to claim 11,
wherein the output-gradation-number setting unit performs a grouping process in which an image block group is determined as a single cluster, the image block group being a group in which more than one of the image blocks determined to satisfy the given criterion are continuously adjacent, and
wherein the output-gradation-number setting unit sets the number of output gradations based on a number of clusters having sizes equal to or larger than a given criterion among the one or more clusters.

14. An image processing method comprising:
calculating a feature value from input image data;
setting, as a number of output gradations, any one gradation number of a plurality of candidates for the number of output gradations based on the calculated feature value; and
processing the input image data and generating output image data having the number of output gradations which is set,
wherein the feature value is an information-loss evaluation value produced if the output image data is generated, and
wherein the number of output gradations is set based on the information-loss evaluation value.

* * * * *